United States Patent
Gonzalez et al.

(10) Patent No.: US 11,485,221 B2
(45) Date of Patent: Nov. 1, 2022

(54) FUEL-SUPPLY ASSEMBLY FOR INTERNAL COMBUSTION ENGINE AND METHOD FOR ASSEMBLING THE SAME

(71) Applicant: Hyster-Yale Group, Inc., Fairview, OR (US)

(72) Inventors: Brien Gonzalez, Portland, OR (US); Alan Kolkemo, Vancouver, WA (US); Hoon Kim, Portland, OR (US); Christopher Beck, Happy Valley, OR (US)

(73) Assignee: Hyster-Yale Group, Inc., Fairview, OR (US)

( * ) Notice: Subject to any disclaimer, the term of this patent is extended or adjusted under 35 U.S.C. 154(b) by 0 days.

(21) Appl. No.: 17/188,048

(22) Filed: Mar. 1, 2021

(65) Prior Publication Data

US 2022/0274482 A1    Sep. 1, 2022

(51) Int. Cl.
| | | |
|---|---|---|
| B60K 15/03 | (2006.01) | |
| B60R 16/03 | (2006.01) | |
| F02M 37/32 | (2019.01) | |
| F02M 37/08 | (2006.01) | |
| F02M 37/00 | (2006.01) | |

(52) U.S. Cl.
CPC .............. *B60K 15/03* (2013.01); *B60R 16/03* (2013.01); *F02M 37/0017* (2013.01); *F02M 37/0076* (2013.01); *F02M 37/08* (2013.01); *F02M 37/32* (2019.01); *B60K 2015/0319* (2013.01); *B60K 2015/0321* (2013.01); *B60K 2015/03236* (2013.01); *B60K 2015/03243* (2013.01); *B60K 2015/03256* (2013.01)

(58) Field of Classification Search
CPC ............ B60K 15/03; B60K 2015/0319; B60K 2015/0321; B60K 2015/03236; B60K 2015/03243; B60K 2015/03256; F02M 37/32; F02M 37/0017; F02M 37/0076; F02M 37/08; B60R 16/03
USPC ................................................ 123/497, 509
See application file for complete search history.

(56) References Cited

U.S. PATENT DOCUMENTS

| | | | |
|---|---|---|---|
| 5,195,494 A | 3/1993 | Tuckey | |
| 5,520,156 A * | 5/1996 | Brunnhofer | F02M 37/42 123/516 |
| 5,762,049 A | 6/1998 | Jones et al. | |
| 6,142,126 A | 11/2000 | Kanamaru | |
| 6,149,399 A * | 11/2000 | Bowser | F02M 37/103 417/279 |
| 6,155,238 A | 12/2000 | Briggs et al. | |
| 6,298,540 B1 | 10/2001 | Benjey et al. | |

(Continued)

*Primary Examiner* — Mahmoud Gimie

(57) ABSTRACT

A universal fuel-supply assembly is adaptable during manufacturing to be made for use with one of multiple different fuel types (e.g., gasoline or diesel fuel). A method for assembling a fuel-supply assembly includes providing a plate structure configured to be secured to a fuel tank. The plate structure has multiple bosses. According to one example, the method determines whether the fuel-supply assembly is for use as a diesel fuel-supply assembly or as a gasoline fuel-supply assembly. The method provides an opening through one of two different bosses that communicates with both the top side and the bottom side of the plate structure depending on whether the fuel-supply assembly is for use as a diesel fuel-supply assembly or a gasoline fuel-supply assembly.

40 Claims, 30 Drawing Sheets

(56) References Cited

U.S. PATENT DOCUMENTS

| | | | |
|---|---|---|---|
| 6,311,725 B1 | 11/2001 | Hamada et al. | |
| 6,435,163 B1* | 8/2002 | Fauser | F02M 37/10 |
| | | | 137/563 |
| 6,966,305 B2 | 11/2005 | Aubrée et al. | |
| 7,497,208 B2 | 3/2009 | Satoh et al. | |
| 7,800,883 B2* | 9/2010 | Nederegger | F02M 37/103 |
| | | | 123/509 |
| 2003/0127075 A1* | 7/2003 | Braun | F02M 37/42 |
| | | | 123/510 |
| 2004/0020839 A1 | 2/2004 | Kato et al. | |
| 2005/0011558 A1 | 1/2005 | Schmitt | |
| 2009/0095264 A1 | 4/2009 | Kawajiri et al. | |
| 2011/0146628 A1* | 6/2011 | Powell | F02M 37/0052 |
| | | | 417/151 |
| 2011/0168134 A1* | 7/2011 | Lim | F02M 37/106 |
| | | | 123/509 |
| 2011/0168136 A1* | 7/2011 | Lim | F02M 37/103 |
| | | | 264/274 |
| 2011/0200472 A1 | 8/2011 | Leppert et al. | |
| 2012/0312759 A1 | 12/2012 | Ries et al. | |
| 2014/0116398 A1* | 5/2014 | Jeon | F02M 37/106 |
| | | | 123/509 |
| 2015/0224873 A1* | 8/2015 | Ishitoya | F02M 37/50 |
| | | | 137/574 |
| 2017/0260943 A1* | 9/2017 | Hayashi | B60K 15/03 |

\* cited by examiner

FUEL-SUPPLY ASSEMBLY FOR INTERNAL COMBUSTION ENGINE AND METHOD FOR ASSEMBLING THE SAME

TECHNICAL FIELD

The present disclosure relates, generally, to a fuel-supply assembly for an internal combustion engine and more particularly relates to a method for assembling a fuel-supply assembly for an internal combustion engine suitable for mounting to a fuel-supply tank.

BACKGROUND INFORMATION

Fuel-delivery assemblies attach to gasoline fuel tanks for pumping fuel from the gasoline fuel tank to the gasoline engine. Such fuel-delivery assemblies generally include a bracket to which various components, such as, fuel pump, fuel sender, etc., are mounted, and which in turn is mounted to the fuel tank. Similarly, fuel-delivery assemblies suitable for providing fuel to diesel engines are also known in the art. However, fuel-delivery assemblies for gasoline fuel engine and diesel fuel engines include different components, and therefore include different configurations. As a result, the present inventors recognized that for manufacturing or assembling the fuel-delivery assemblies, different production tooling and different inventories were required. Moreover, the present inventors recognized that production of gasoline fuel-delivery assemblies and of diesel fuel-delivery assemblies either requires separate production lines or requires complex line changeovers, which are both costly and time consuming.

SUMMARY OF DISCLOSURE

One aspect of this disclosure relates to a universal fuel-supply assembly that is adaptable during manufacturing to be made for use with one of multiple different fuel types (e.g., gasoline or diesel fuel).

Another aspect of this disclosure relates to a method for assembling a fuel-supply assembly from a plate structure having multiple bosses.

In one embodiment, an example method for assembling a fuel-supply assembly for use with a fuel tank to supply fuel to an internal combustion engine comprises providing a mounting structure configured to be secured to a fuel tank. The mounting structure comprises a plate structure having a top side and a bottom side, and a first boss extending from the plate structure and defining a filter cavity shaped and sized to receive a fuel filter. The mounting structure also includes a fuel-delivery conduit shaped and sized to define an outlet path for facilitating an exit of the fuel from the fuel-supply assembly. The fuel-delivery conduit fluidly communicates with the filter cavity. Moreover, the mounting structure includes a second boss extending from the plate structure and defining an opening extending through the second boss. The opening communicates with both the top side and the bottom side of the plate structure. The mounting structure also includes a third boss extending from the plate structure and a fourth boss extending from the plate structure. The method further includes determining whether the fuel-supply assembly is for use as a diesel fuel-supply assembly or as a gasoline fuel-supply assembly. Moreover, the method includes providing an opening through one of either the third boss or the fourth boss, depending on whether the fuel-supply assembly is for use as a diesel fuel-supply assembly or a gasoline fuel-supply assembly. The opening communicates with both the top side and the bottom side of the plate structure. The opening is through the third boss if the fuel-supply assembly is for use as a gasoline fuel-supply assembly, or the opening is through the fourth boss if the fuel-supply assembly is for use as a diesel fuel-supply assembly.

In some additional, alternative, or selectively cumulative embodiments, the method further comprises releasably securing a cap to the filter cavity. The filter cavity and the cap are shaped, sized and located to provide access to the fuel filter when the fuel-supply assembly is secured to a fuel tank and the cap is removed.

In some additional, alternative, or selectively cumulative embodiments, the method further comprises placing a fuel sender through the opening associated with the second boss and securing the fuel sender to the second boss; and placing a fuel-return conduit through the opening associated with the fourth boss and securing the fuel-return conduit to the fourth boss in response to determining that the fuel-supply assembly is for use as a diesel fuel-supply assembly.

In some additional, alternative, or selectively cumulative embodiments, the method further comprises placing a fuel sender through the opening associated with the second boss and securing the fuel sender to the second boss; and placing a fuel pump connector through the opening associated with the third boss and securing the fuel pump connector to the third boss in response to determining that the fuel-supply assembly is for use as a gasoline fuel-supply assembly.

In some additional, alternative, or selectively cumulative embodiments, the mounting structure includes a fuel pump bracket mount on the bottom side of the plate structure. The method further comprises attaching a fuel pump support structure to the fuel pump bracket mount in response to determining that the fuel-supply assembly is for use as a gasoline fuel-supply assembly.

In some additional, alternative, or selectively cumulative embodiments, the method further includes mounting a fuel pump to the fuel pump support structure and electrically connecting the fuel pump connector to the fuel pump.

In some additional, alternative, or selectively cumulative embodiments, the fuel-delivery conduit provides a first outlet location defining a first outlet port and a second outlet location defining a second outlet port.

In some additional, alternative, or selectively cumulative embodiments, determining whether the fuel-supply assembly is for use as a diesel fuel-supply assembly or as a gasoline fuel-supply assembly further comprises determining whether the fuel-supply assembly is for use as a diesel fuel-supply assembly for a certified diesel engine or for a non-certified diesel engine. The method also includes providing the first outlet port as a fuel outlet port in response to determining that the fuel-supply assembly is for use as a diesel fuel-supply assembly for a non-certified diesel engine or providing the second outlet port as a fuel outlet port in response to determining that the fuel-supply assembly is for use as a diesel fuel-supply assembly for a certified diesel engine.

In some additional, alternative, or selectively cumulative embodiments, in response to determining that the fuel-supply assembly is for use as a gasoline fuel-supply assembly, the method further comprises providing the first outlet port of the fuel-delivery conduit as a fuel outlet port and providing the second outlet port of the fuel-delivery conduit as a sensor port.

In some additional, alternative, or selectively cumulative embodiments, the method further includes securing a sensor in the second outlet port of the fuel-delivery conduit.

In some additional, alternative, or selectively cumulative embodiments the mounting structure includes a fifth boss on the bottom side of the plate structure. In response to determining that the fuel-supply assembly is for use as a gasoline fuel-supply assembly, the method further comprises providing an elongated opening through the fifth boss that communicates with fuel-delivery conduit. The elongated opening facilitates a bleeding of the fuel from the fuel-delivery conduit. The method also includes securing a relief valve to the fifth boss such that relief valve communicates with the elongated opening and controls the bleeding of the fuel from the fuel-delivery conduit.

In accordance with another example embodiment, a fuel-supply assembly for an internal combustion engine is disclosed. The fuel-supply assembly includes a base structure having a first side and a second side opposite the first side and a cavity at least partially formed in the base structure. The cavity is shaped and sized for receiving a fuel filter. The fuel-supply assembly also includes a fuel-delivery conduit secured to the base structure and defining an outlet port position for facilitating an exit of fuel from the fuel-supply assembly. The fuel-delivery conduit is fluidly connected to the cavity. Further, the fuel-supply assembly includes a first mount structure secured to the base structure and defining a first aperture extending through the base structure. The first aperture and the first mount structure are shaped and sized to hold and retain a fuel sender to the base structure. The fuel-supply assembly also includes a second mount structure secured to the base structure and a third mount structure secured to the base structure. The second mount structure is shaped and sized to retain a fuel pump connector for a gasoline fuel-supply assembly to the base structure, while the third mount structure is shaped and sized to retain a fuel-return conduit for a diesel fuel-supply assembly to the base structure.

In some additional, alternative, or selectively cumulative embodiments, the fuel-supply assembly further comprises a connector aperture extending through the base structure and associated with the second mount structure. The connector aperture is shaped and sized to cooperate with the second mount structure for retaining a fuel pump connector to the base structure.

In some additional, alternative, or selectively cumulative embodiments, the fuel-supply assembly further comprises a return aperture through the base structure and associated with the third mount structure. The return aperture is shaped and sized to cooperate with the third mount structure for retaining a fuel-return conduit to the base structure.

In some additional, alternative, or selectively cumulative embodiments, the outlet port position of the fuel-delivery conduit comprises a first outlet position and a second outlet position, and a fuel outlet port is located at the first outlet position and a sensor port is located at the second outlet position. The sensor port is shaped and sized to retain at least one sensor at the second outlet position.

In some additional, alternative, or selectively cumulative embodiments, the fuel-supply assembly further comprises a fuel pump support structure secured to the base structure, the fuel pump connector mounted in the connector aperture and secured to the second mount structure, a fuel pump mounted to the fuel pump support structure and electrically connected to the fuel pump connector; and the fuel sender mounted in the first aperture and secured to the first mount structure.

In some additional, alternative, or selectively cumulative embodiments, the fuel sender is mounted in the first aperture and is secured to the first mount structure, and the fuel-return conduit is mounted in the connector aperture and secured to the third mount structure.

In some additional, alternative, or selectively cumulative embodiments, the outlet port position of the fuel-delivery conduit comprises a first outlet position and a second outlet position, and a fuel outlet port is located at the second outlet position for supplying fuel to a certified diesel engine.

In some additional, alternative, or selectively cumulative embodiments, the outlet port position of the fuel-delivery conduit comprises a first outlet position and a second outlet position, and a fuel outlet port is located at the first outlet position for supplying fuel to a non-certified diesel engine.

In some additional, alternative, or selectively cumulative embodiments, the fuel-supply assembly further comprises a fourth mount structure secured to the base structure and extending downwardly of the base structure. The fourth mount structure is shaped and sized to retain a relief valve for a gasoline fuel-supply assembly to the base structure. The fuel-supply assembly further includes an elongated opening extending through the base structure and associated with the fourth mount structure and in fluid communication with the fuel-delivery conduit. The relief valve fluidly communicates with the elongated opening and controls a bleeding of the fuel from the fuel-delivery conduit.

In some additional, alternative, or selectively cumulative embodiments, the fuel-supply assembly further comprises a debris chamber communicating with the cavity shaped and sized for receiving the fuel filter, wherein an inlet conduit communicates with the debris chamber; and a debris trap located in the debris chamber.

In some additional, alternative, or selectively cumulative embodiments, the fuel-supply assembly further comprises an extension associated with the debris trap. The extension is located proximate to the inlet conduit and extends away from the inlet conduit.

Additional aspects and advantages will be apparent from the following detailed description of example embodiments, which proceeds with reference to the accompanying drawings.

DETAILED DESCRIPTION

Figure 1:
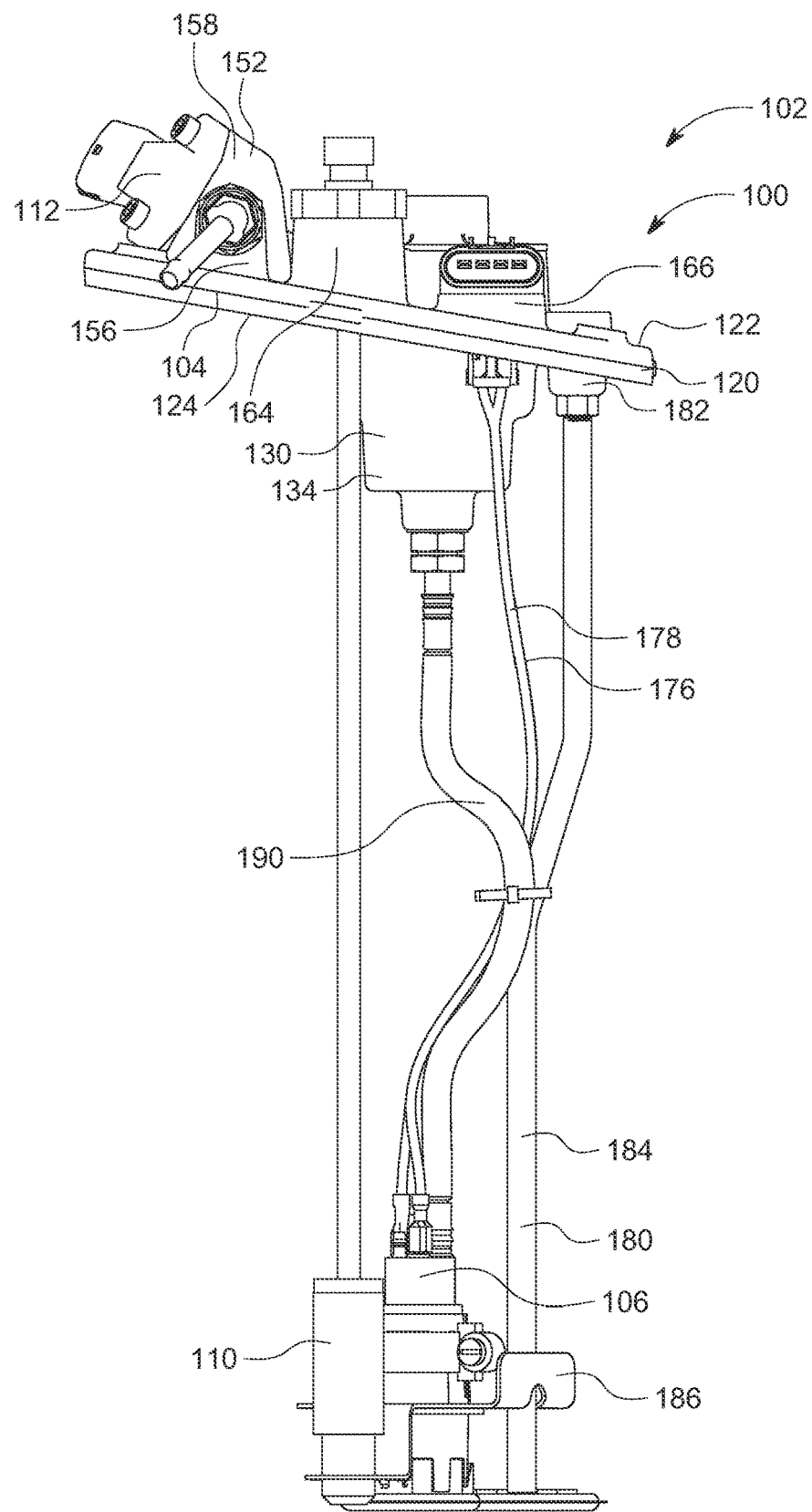
FIG. 1 illustrates a front perspective view of an example gasoline fuel-supply assembly for an internal combustion engine, in accordance with an embodiment.

Example embodiments are described below with reference to the accompanying drawings. Unless otherwise expressly stated in the drawings, the sizes, positions, etc., of components, features, elements, etc., as well as any distances therebetween, are not necessarily to scale, and may be disproportionate and/or exaggerated for clarity.

The terminology used herein is for the purpose of describing particular example embodiments only and is not intended to be limiting. As used herein, the singular forms "a," "an" and "the" are intended to include the plural forms as well, unless the context clearly indicates otherwise. It should be recognized that the terms "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. Unless otherwise specified, a range of values, when recited, includes both the upper and lower limits of the range, as well as any sub-ranges therebetween. Unless indicated otherwise, terms such as "first," "second," etc., are only used to distinguish one element from another. For example, one element could be termed a "first element" and similarly, another element could be termed a "second element," or vice versa. The section headings used herein are for organizational purposes only and are not to be construed as limiting the subject matter described.

Unless indicated otherwise, the terms "about," "thereabout," "substantially," etc. mean that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art.

Spatially relative terms, such as "right," left," "below," "beneath," "lower," "above," and "upper," and the like, may be used herein for ease of description to describe one element's or feature's relationship to another element or feature, as illustrated in the drawings. It should be recognized that the spatially relative terms are intended to encompass different orientations in addition to the orientation depicted in the figures. For example, if an object in the figures is turned over, elements described as "below" or "beneath" other elements or features would then be oriented "above" the other elements or features. Thus, the term "below" can, for example, encompass both an orientation of above and below. An object may be otherwise oriented (e.g., rotated 90 degrees or at other orientations) and the spatially relative descriptors used herein may be interpreted accordingly.

Unless clearly indicated otherwise, all connections and all operative connections may be direct or indirect. Similarly, unless clearly indicated otherwise, all connections and all operative connections may be rigid or non-rigid.

Like numbers refer to like elements throughout. Thus, the same or similar numbers may be described with reference to other drawings even if they are neither mentioned nor described in the corresponding drawing. Also, even elements that are not denoted by reference numbers may be described with reference to other drawings.

Many different forms and embodiments are possible without deviating from the spirit and teachings of this disclosure and so this disclosure should not be construed as limited to the example embodiments set forth herein. Rather, these example embodiments are provided so that this disclosure will be thorough and complete, and will convey the scope of the disclosure to those skilled in the art.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments.

Figure 2:
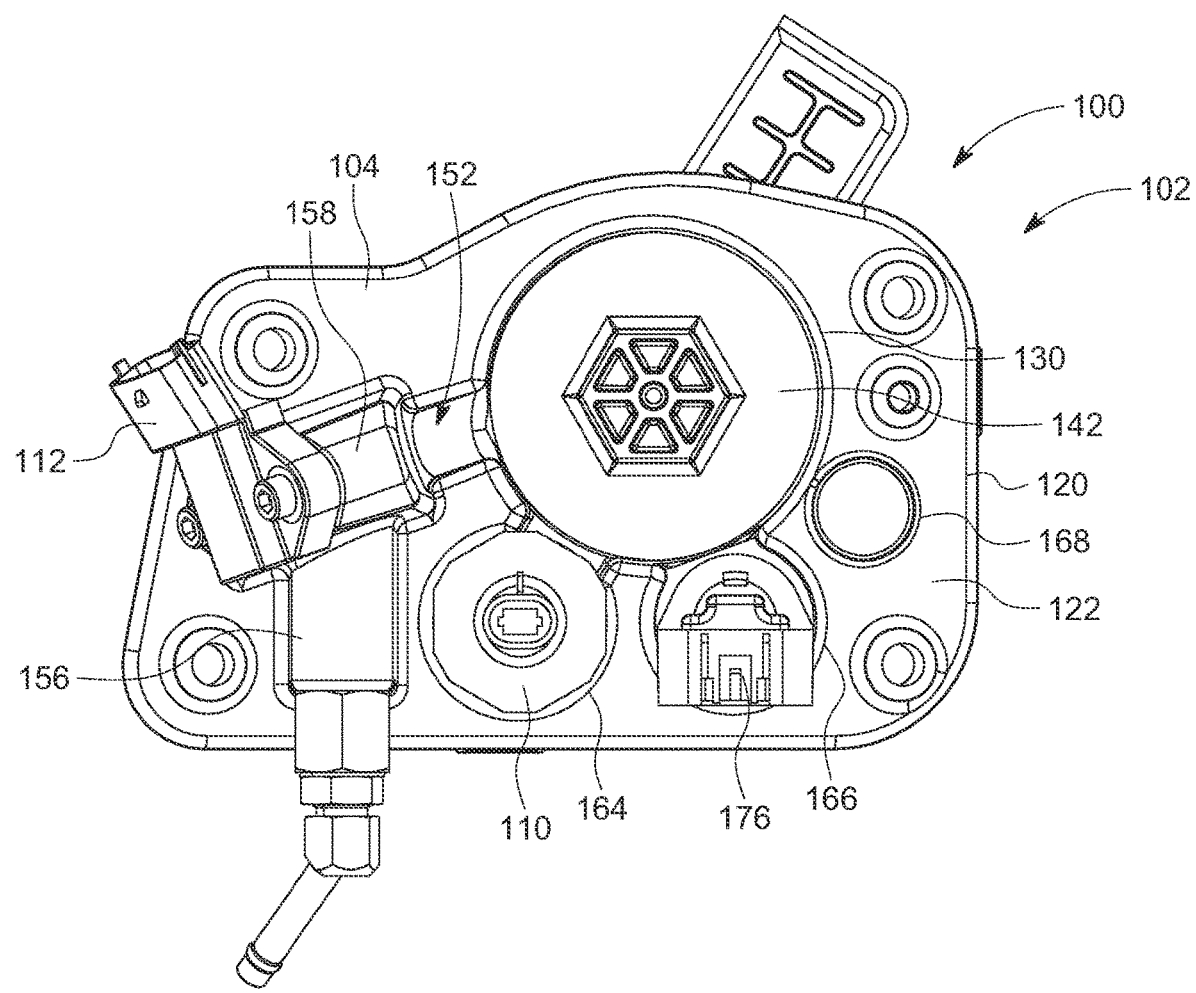
FIG. 2 illustrates a top view of the gasoline fuel-supply assembly of FIG. 1.
Figure 3:
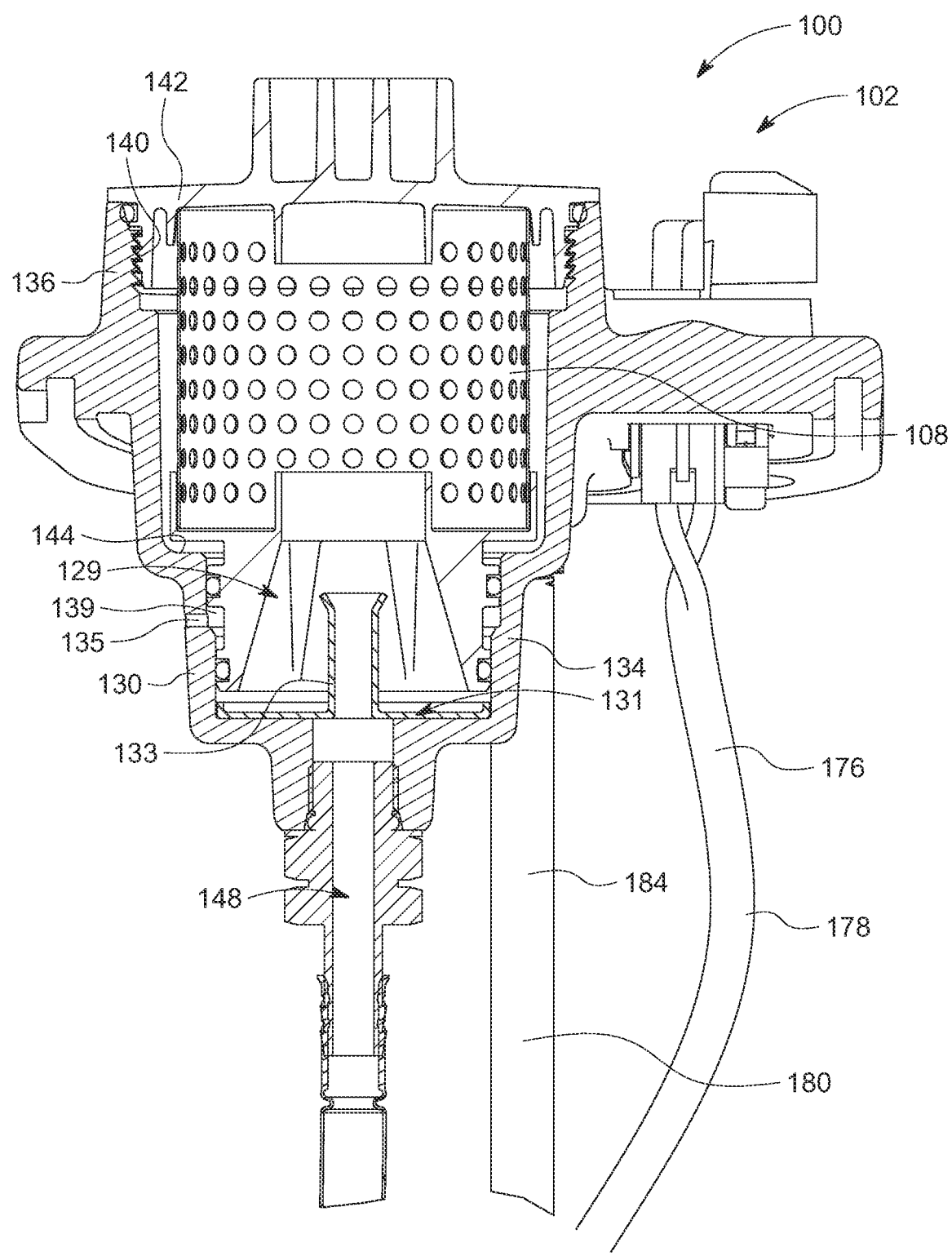
FIG. 3 illustrates a sectional view of the gasoline fuel-supply assembly of FIG. 1 depicting a fuel filter arranged inside a cavity.

Referring to FIGS. 1 to 3, a fuel-supply assembly 100, for example, a gasoline fuel-supply assembly 102, for an internal combustion engine, for example, a gasoline engine, is shown. The gasoline fuel-supply assembly 102 is adapted to mount to a fuel-supply tank (not shown) and includes a mounting plate 104 adapted to releasably couple to a wall of the fuel-supply tank to facilitate the mounting of the gasoline fuel-supply assembly 102 to the fuel-supply tank. As shown in FIG. 1, the mounting plate 104 also supports various components of the gasoline fuel-supply assembly 102. For example, a fuel pump 106, a fuel filter 108 (shown in FIG. 3), a fuel sender 110, one or more sensors 112, for example, a temperature sensor or a pressure sensor or a combined temperature and pressure sensor, are mounted to the mounted plate 104, and hence supported by the mounted plate 104. To support the various component of the gasoline fuel-supply assembly 102, the mounting plate 104 may include a plurality of apertures or openings, and a plurality of mount structures.

Figure 4:
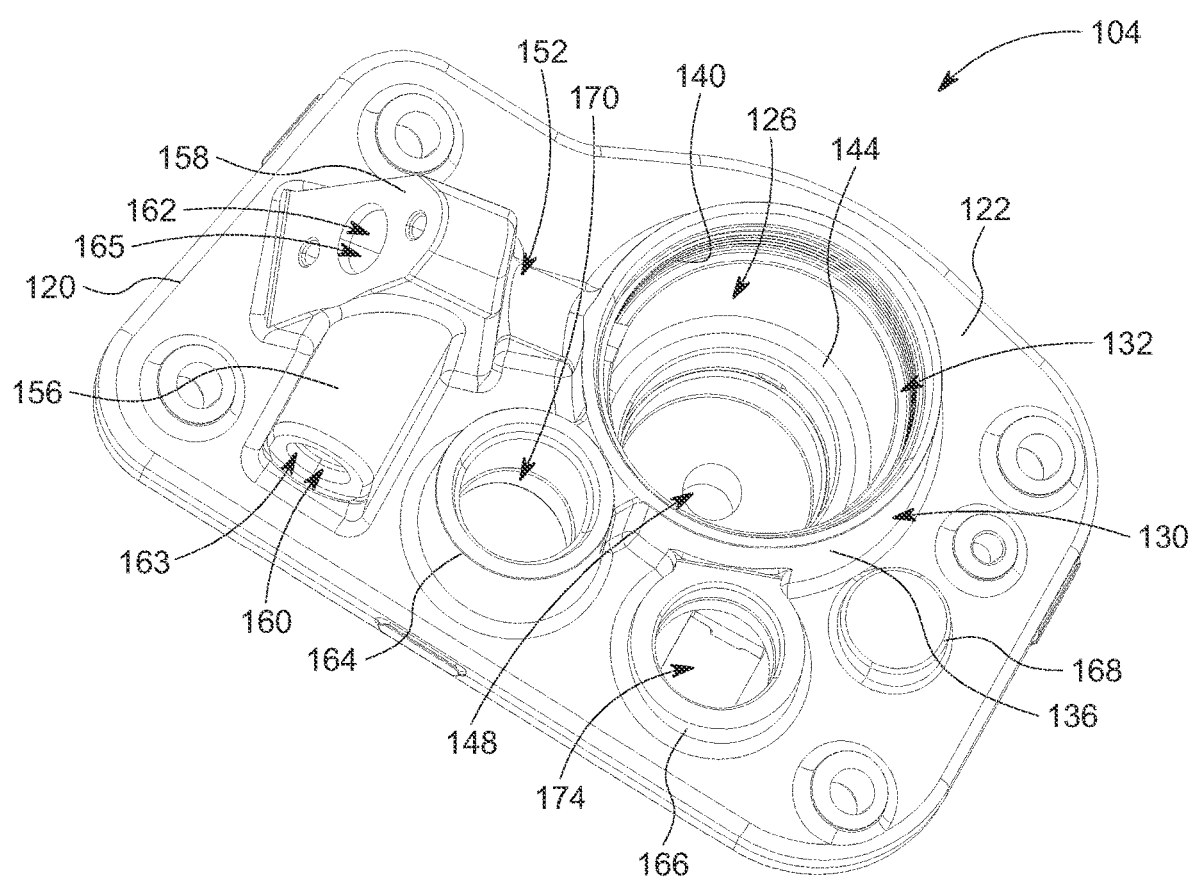
FIG. 4 illustrates a top perspective view of a mounting plate of the gasoline fuel-supply assembly of FIG. 1.
Figure 5:
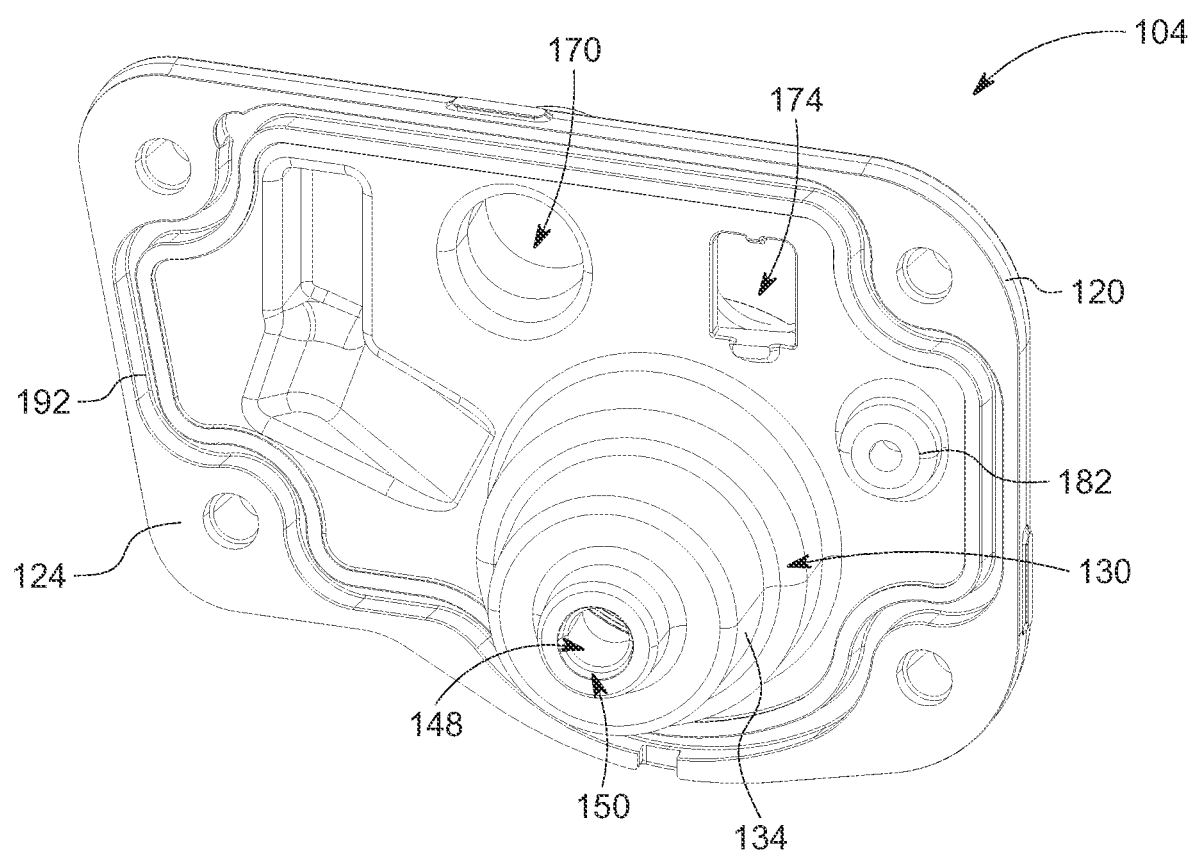
FIG. 5 illustrates a bottom perspective view of the mounting plate of the gasoline fuel-supply assembly of FIG. 1.
Figure 6:
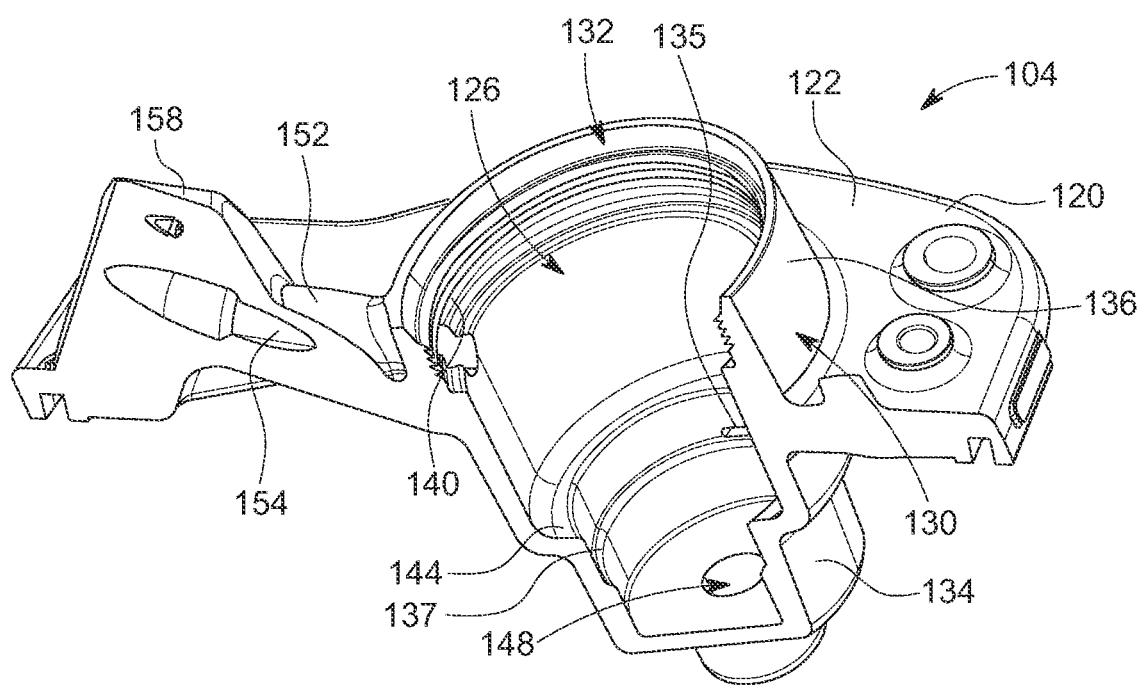
FIG. 6 illustrates a sectional perspective view of the mounting plate of FIG. 5 of the gasoline fuel-supply assembly of FIG. 1 depicting a passage of a fuel-delivery conduit of the mounting plate.
Figure 7:
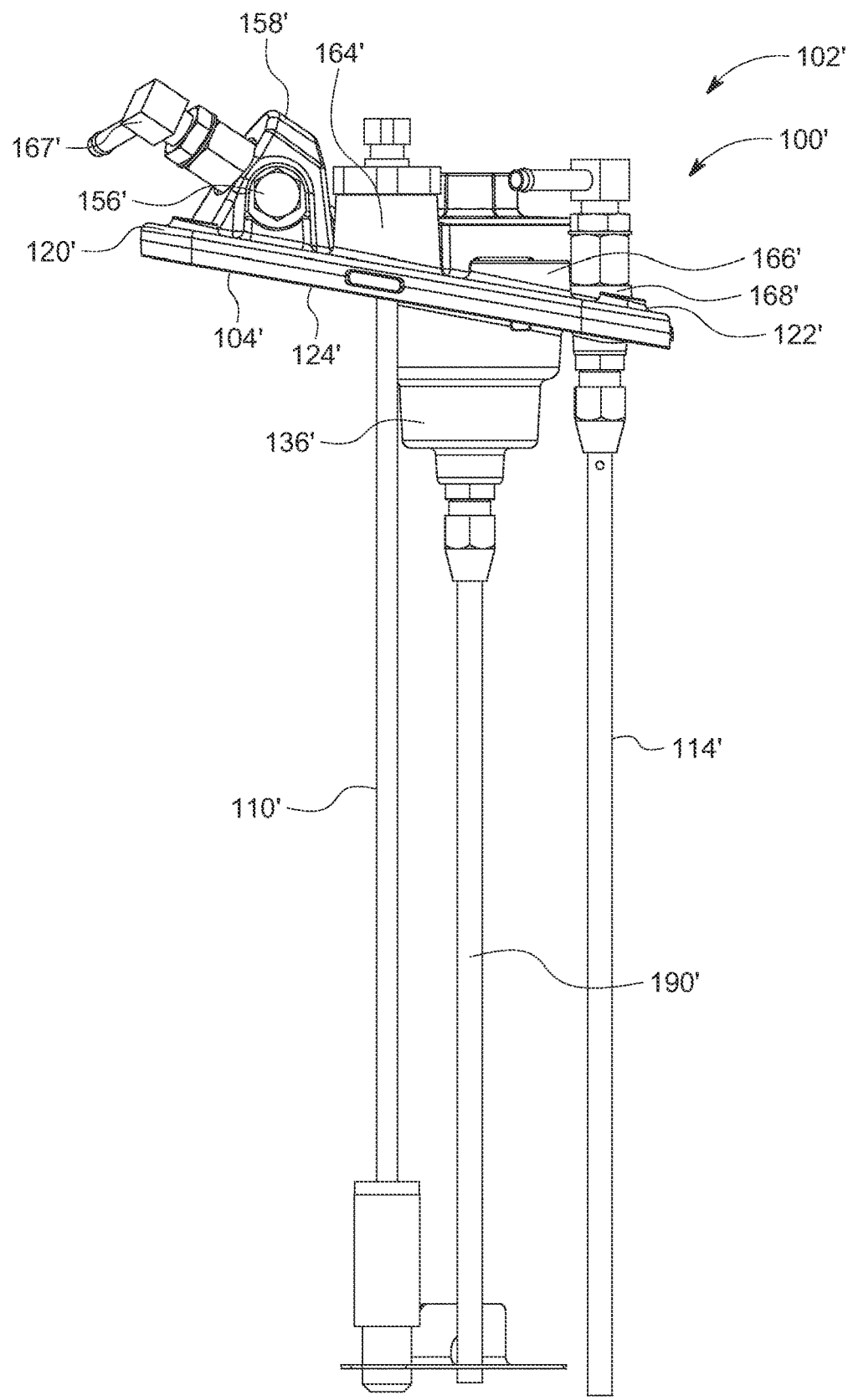
FIG. 7 illustrates a front perspective view of an exemplary diesel fuel-supply assembly for an internal combustion engine.
Figure 8:
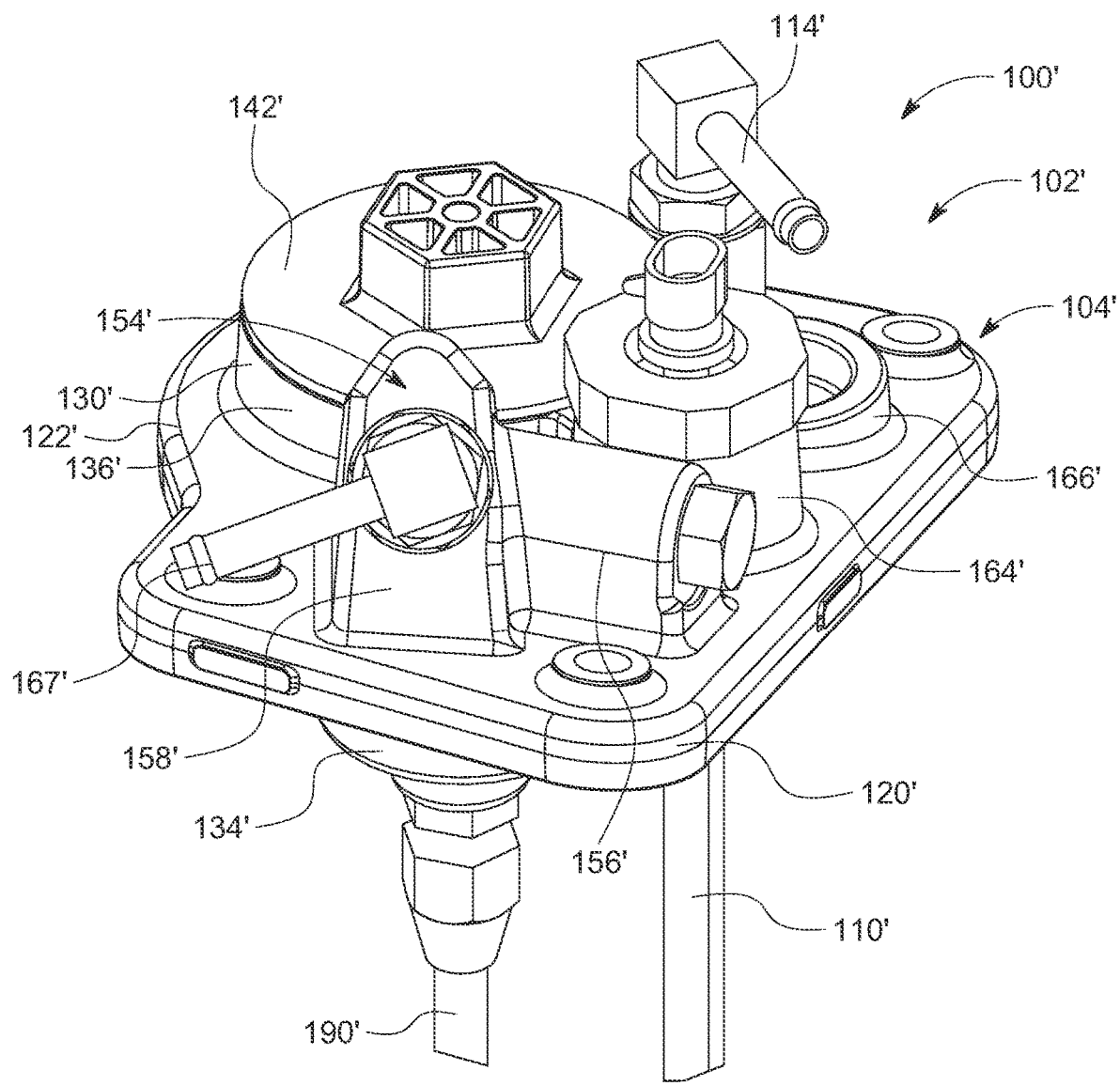
FIG. 8 illustrates a top perspective view of the diesel fuel-supply assembly of FIG. 7.
Figure 9:
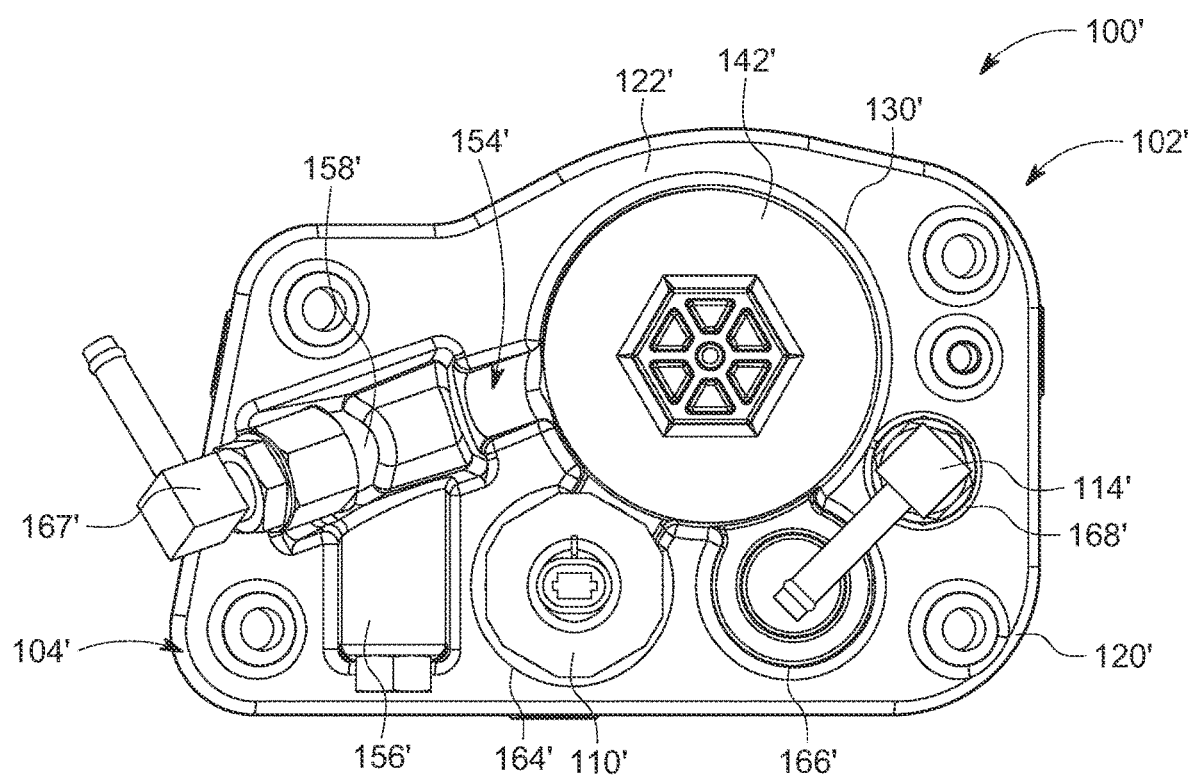
FIG. 9 illustrates a top view of the diesel fuel-supply assembly of FIG. 7.

Referring to FIGS. 4 to 6, the mounting plate 104 includes a base structure 120 having a first side 122 (also referred to as top side 122) and a second side 124 (also referred to as bottom side 124) arranged opposite to the first side 122, and a cavity 126 or a chamber arranged substantially centrally to the base structure 120 and adapted to receive and support the fuel filter 108. As shown in FIG. 3, the fuel filter 108 may generally be a cylindrical fuel filter defining a central channel to receive the fuel from the fuel-supply tank and is adapted to filter the fuel as the fuel moves through the fuel filter 108 in a radial direction. A shape, size, and material of the fuel filter 108 is selected such that the fuel filter 108 is able to filter impurities from a gasoline fuel.

Optionally, a debris chamber 129 (shown in FIG. 3) may be included in the cavity 126. In one example, the first portion 134 of the first boss 130 is constructed and sized to extend below the fuel filter 108 to create debris chamber 129. A debris trap 131 (shown in FIG. 3) may be included in the debris chamber 129 and be shaped and sized to fit at the bottom of the debris chamber 129 proximate the inlet conduit 148. The debris trap 131 may include a hollow, tubular extension 133 constructed to be located proximate the inlet conduit 148 and extend away from the inlet conduit 148 when the debris trap 131 is located in the debris chamber 129. The debris trap 131 and its extension 133 may be made from a fuel resistant material, such as high-density polyethylene, stainless steel, or other suitable material, and may have a solid surface or may be constructed as a fine mesh. The debris chamber 129 and debris trap 131 may cooperate to retain debris that may enter the cavity 126 when the fuel filter 108 is removed to be replaced or cleaned. Including the hollow, tubular extension 133 may hinder debris from moving from the debris chamber 129 through the inlet conduit 148 and into the fuel tank. Optionally, a mesh cap or screen may be located over the end of the hollow, tubular extension 133 that is distal from the inlet conduit 148.

Referring back to FIGS. 4 to 6, the cavity 126 may be defined by a boss, for example, a first boss 130, having an access opening 132 defined at the first side 122 of the base structure 120 to facilitate an insertion or removal of the fuel filter 108 from the cavity 126. As shown, the first boss 130 extends outwardly of the base structure 120 and includes a first portion 134 (majority portion) disposed on the second side 124, and a second portion 136 (minority portion) arranged at the first side 122 of the base structure 120. As illustrated, the second portion 136 defines the access opening 132, and may include a threaded structure 140 to enable a securing of a cap 142 (best shown in FIGS. 2 and 3) to the base structure 120 and the fuel filter 108 to cover the access opening 132. The cap 142 facilitates retention of the fuel filter 108 within the cavity 126. In some embodiments, the cap 142 may be integrally formed with the fuel filter 108. Further, the first portion 134 may define a seat 144 disposed inside the cavity 126 and extending radially inside the cavity 126. In an assembly, (as shown in FIG. 3) the fuel filter 108 is spaced off the seat 144 when disposed inside the cavity 126 such that the central channel of the fuel filter 108 is aligned with an inlet conduit 148 defined by the first portion 134 and extending from a free end of the first portion 134 to the cavity 126. The inlet conduit 148 provides a passage of the fuel from an inlet port 150 (shown in FIG. 5) to the central channel of the fuel filter 108. In some embodiments, the first boss 130 may define one or more circular grooves to receive one or more seals to prevent a leakage of the fuel. In some implementations, the one or more seals are arranged on the fuel filter 108 and cooperates with the inner surface of the first boss 130 or one or more features provided on the inner surface of the first boss 130 to prevent a leakage of the fuel.

Optionally, a fuel drain port 135 may be included in the cavity 126. In an embodiment, a fuel drain port 135 may be included for a fuel-supply assembly 102 configured for use with a gasoline engine. The fuel drain port 135 may be located in the cavity 126 such that the fuel drain port 135 is straddled by adjacent sealing members between the fuel filter 108 and the inner surface of the filter cavity 126. Optionally, the fuel drain port 135 may be located proximate a lip 137. Sealing members 139 (FIG. 3) associated with the fuel filter 108 may be configured to engage the lip 137 and to block the fuel drain port 135 when the fuel filter 108 is located in the cavity 126. When the fuel filter 108 is removed from the cavity 126, the sealing member 139 may also be removed from the lip 137 and unblock the fuel drain port 135, thus allowing at least a portion of the fuel in the cavity 126 to drain into the fuel tank as the fuel filter 108 is removed from the cavity 126. Optionally, the sealing member 139 may be connected to the fuel filter 108.

Further, the mounting plate 104 includes a fuel-delivery conduit 152 arranged at the first side 122 and extending outwardly of the base structure 120. The fuel-delivery conduit 152 defines a passage 154 (best shown in FIG. 6) extending along a length of the fuel-delivery conduit 152. The passage 154 is in fluid communication with the cavity 126, and hence the fuel filter 108, and facilitates a passage of the fuel from the fuel filter 110 to the internal combustion engine. As shown, the fuel-delivery conduit 152 includes a first end portion 156 and a second end portion 158, each arranged distally from the cavity 126. The first end portion 156 defines a first fuel outlet position for the fuel-delivery conduit 152, while the second end portion 158 defines a second fuel outlet position for the fuel-delivery conduit 152. As shown, an opening, for example, a first outlet port 160 is defined at the first outlet position and an opening, for example, a second outlet port 162 is defined at the second outlet position. As shown in FIG. 4, the first outlet port 160 defines a fuel outlet port 163 of the fuel-delivery conduit that facilitates an exit of the fuel from the gasoline fuel-supply assembly 102, while the second outlet port 162 defines a sensor port 165. As shown in FIGS. 1 and 2, the sensor 112 is mounted to the second end portion 158 such that a sensing element extend inside the passage 154 through the second outlet port 162, and measures/determines one or more parameters of the fuel flowing through the passage 154 (i.e., the fuel-delivery conduit 152). In an embodiment, the one or more parameters may include a temperature, a pressure, a viscosity, an octane number, etc., of the fuel. In embodiments, both the fuel outlet port 163 and the second outlet port 162 may include threads for facilitating the engagement of a fuel conduit 163 and the sensor 112 to the fuel outlet port 163 and the sensor port 165 respectively.

Additionally, the mounting plate 104 includes a first mount structure 164, a second mount structure 166, and a third mount structure 168 extending from the base structure 120 and arranged at the first side 122 of the base structure 120. As shown, the first mount structure 164 defines an opening, for example, a first aperture 170, extending through the base structure 120 from the first side 122 to the second side 124. The first aperture 170 facilitates an extension of the fuel sender 110 of the gasoline fuel-supply assembly 102 from the first side 122 to the second side 124, and hence facilitates an insertion and removal of the fuel sender 110 inside the fuel-supply tank without disengaging the mounting plate 104 from the fuel-supply tank. In an embodiment, the first mount structure 164 may include an engagement structure, for example, a threaded structure, arranged on the first side 122 of the base structure 120 to secure and engage the fuel sender 110 with the first mount structure 164. Although the threaded structure is contemplated as the engagement structure, it may be appreciated that any other type or engagement structure that facilitates retention of the fuel sender 110 with the first mount structure 164 is also possible. In some embodiments, the fuel sender 110 may be press fitted within the first aperture 170, thereby securing or engaging the fuel sender 110 with the first mount structure 164. The fuel sender 110 includes a level sensor to monitor a level of the fuel inside the fuel-supply tank.

Similar to the first mount structure 164, the second mount structure 166 defines an opening, for example, a connector aperture 174, extending through the base structure 120 from the first side 122 to the second side 124. The second mount structure 166 facilitates an engagement of a fuel pump connector 176 (shown in FIGS. 1 and 2) of the gasoline fuel-supply assembly 102 to the mounting plate 104. Also, the fuel pump connector 176 extends through the connector aperture 174 and connects to the fuel pump 106 and enables a supply of electricity to the fuel pump 106. As shown, the fuel pump connector 176 may include an electric cable 178 (shown in FIG. 1 and FIG. 3) extending through the base structure 120 and connected to the fuel pump 106 arranged on the second side 124 of the mounting plate 104. The electric cable 178 may be connected to an electric source (not shown) to provide an electric power to the fuel pump 106 for operating the fuel pump 106. The fuel pump 106 may be any suitable type of fuel pump known in the art that can provide the fuel from the fuel-supply tank to the fuel filter 110 and subsequently to the internal combustion engine.

Additionally, the gasoline fuel-supply assembly 102 may include a fuel pump support structure 180 (shown in FIGS. 1 and 3) secured to the second side 124 of the base structure 120 and extends outwardly of the second side 124. To facilitate a securing or connection of the fuel pump support structure 180, the mounting plate 104 may include a connecting structure, for example, a fuel pump bracket mount 182 (best shown in FIG. 5) arranged on the second side 124 of the base structure 120 and extending outwardly of the base structure 120. As illustrated, the fuel pump support structure 180 may include an elongated rod 184 connected to the fuel pump bracket mount 182 and extending outwardly and away from the second side 124 of the base structure 120. To connect the fuel pump 106 to the fuel pump support structure 180, the fuel pump support structure 180 may include a fuel pump bracket 186 that is connected to the fuel pump 106 and the elongated rod 184. As shown, the fuel pump bracket 186 is connected proximate to a free end of the elongated rod 184 and is supported by the fuel pump support structure 180.

Accordingly, the fuel pump 106 is supported by the fuel pump support structure 180, and hence by the mounting plate 104. In some implementations, the fuel pump bracket 186 may be releasably connected to the elongated rod 184 and may be secured to the elongated rod 184 by using fasteners. Alternatively, the fuel pump bracket 186 may be fixedly attached with the elongated rod 184 or may be integrally formed with the elongated rod 184. Further, the gasoline fuel-supply assembly 102 may include an inlet tube 190 (best shown in FIG. 1) connected to an outlet of the fuel pump 106 and the inlet port 150 of the cavity 126. Also, the mounting plate 104 may include a sealing groove 192 (shown in FIG. 5) arranged on the second side 124 of the base structure 120 and extending along a periphery of the base structure 120. The sealing groove 192 is adapted to receive a sealing ring to facilitate a sealing of the base structure 120 with the fuel-supply tank.

Referring to FIGS. 7 to 10, a fuel-supply assembly 100', for example, a diesel fuel-supply assembly 102', for an internal combustion engine, for example, a diesel engine, is shown. The diesel fuel-supply assembly 102' is adapted to mount to a fuel-supply tank (not shown) and includes a mounting plate 104' adapted to releasably couple to a wall of the fuel-supply tank to facilitate the mounting of the diesel fuel-supply assembly 102' to the fuel-supply tank (not shown). As shown in FIG. 4, the mounting plate 104' also supports various components of the diesel fuel-supply assembly 102'. For example, a fuel filter 108', a fuel sender 110', and a fuel-return conduit 114', etc., are mounted to the mounting plate 104', and hence supported by the mounting plate 104'. To support the various component of the diesel fuel-supply assembly 102', the mounting plate 104' may include a plurality of apertures or opening, and a plurality of mount structures.

Figure 10:
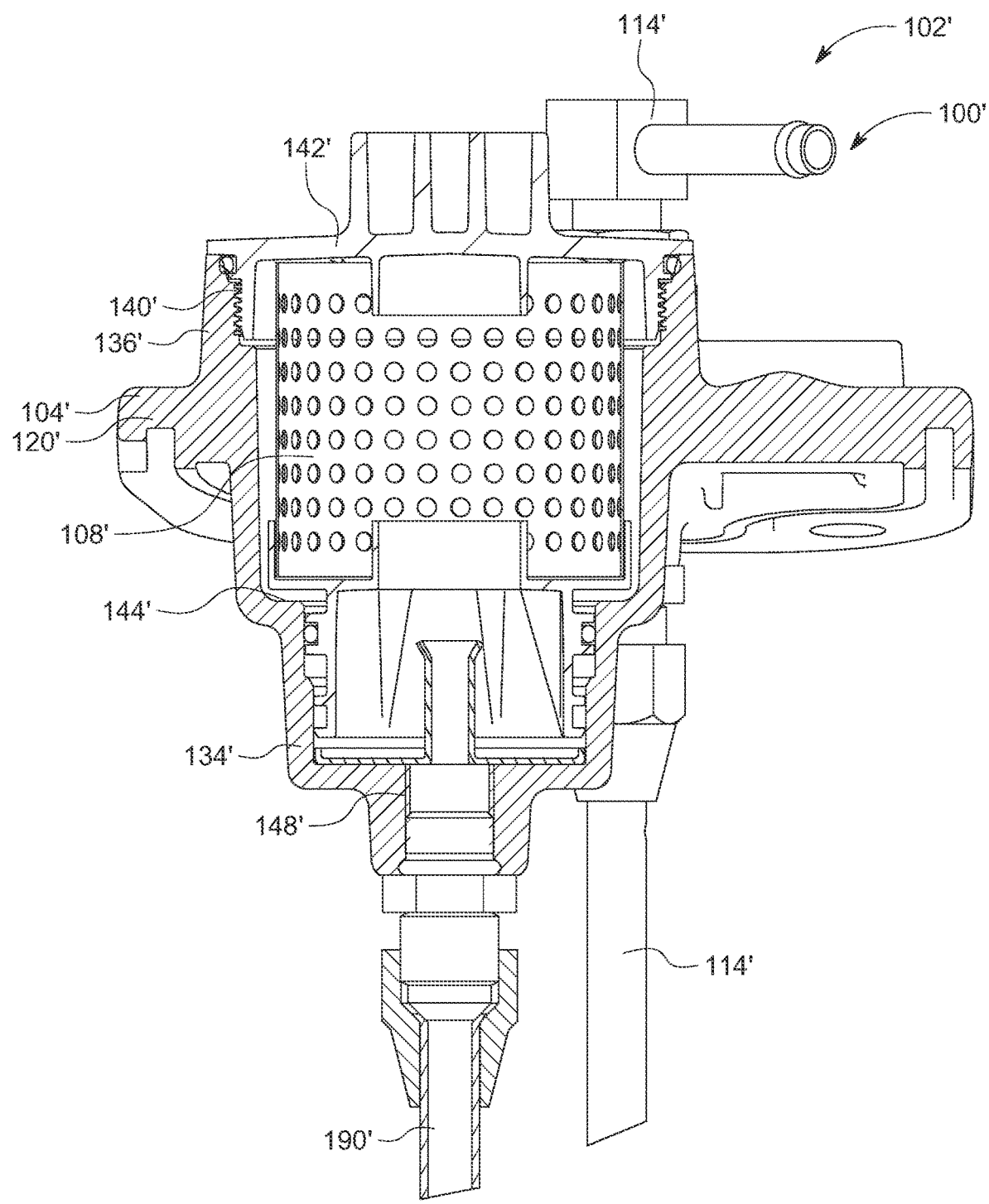
FIG. 10 illustrates a sectional view of the diesel fuel-supply assembly of FIG. 7 depicting a fuel filter arranged inside a cavity.
Figure 11:
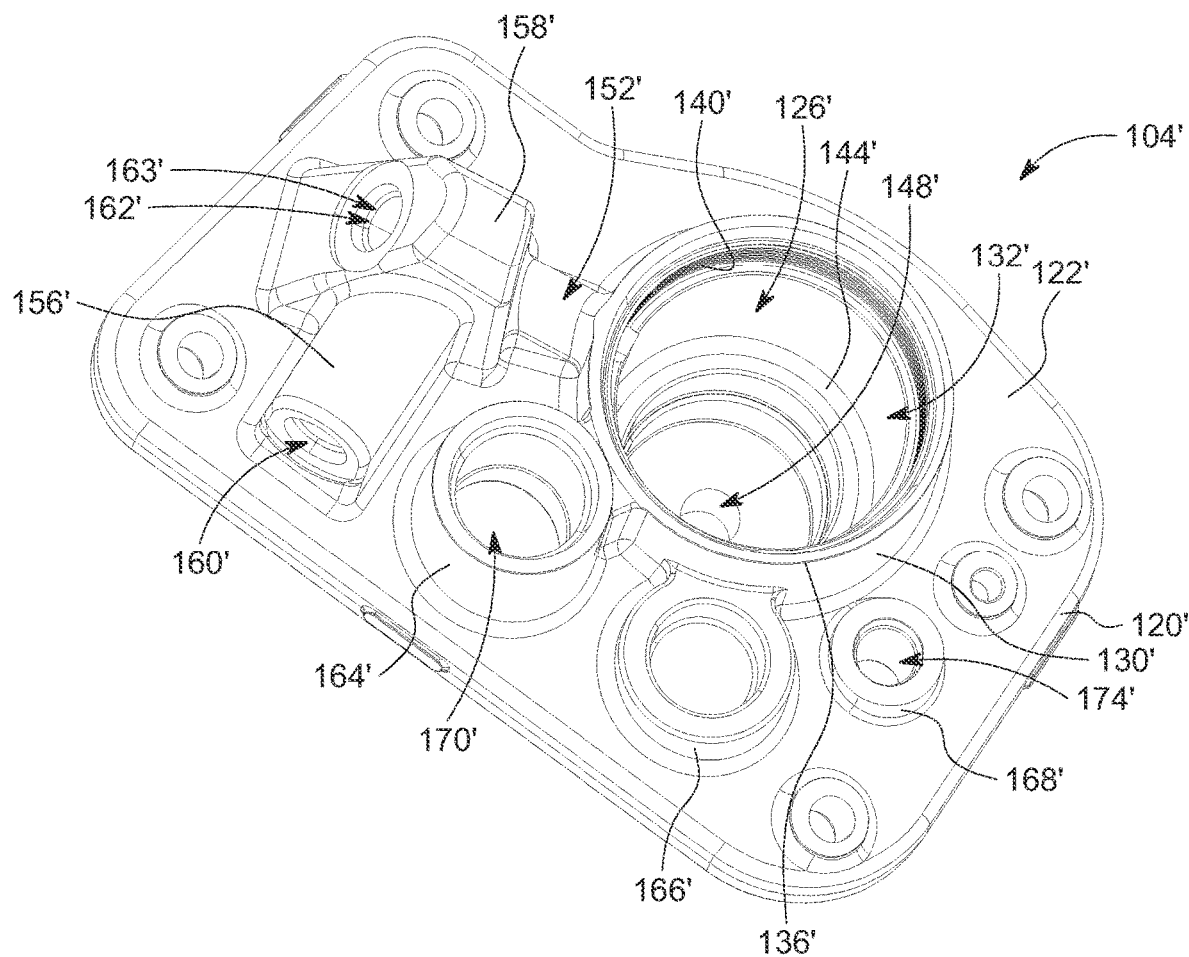
FIG. 11 illustrates a top perspective view of a mounting plate of the diesel fuel-supply assembly of FIG. 7.
Figure 12:
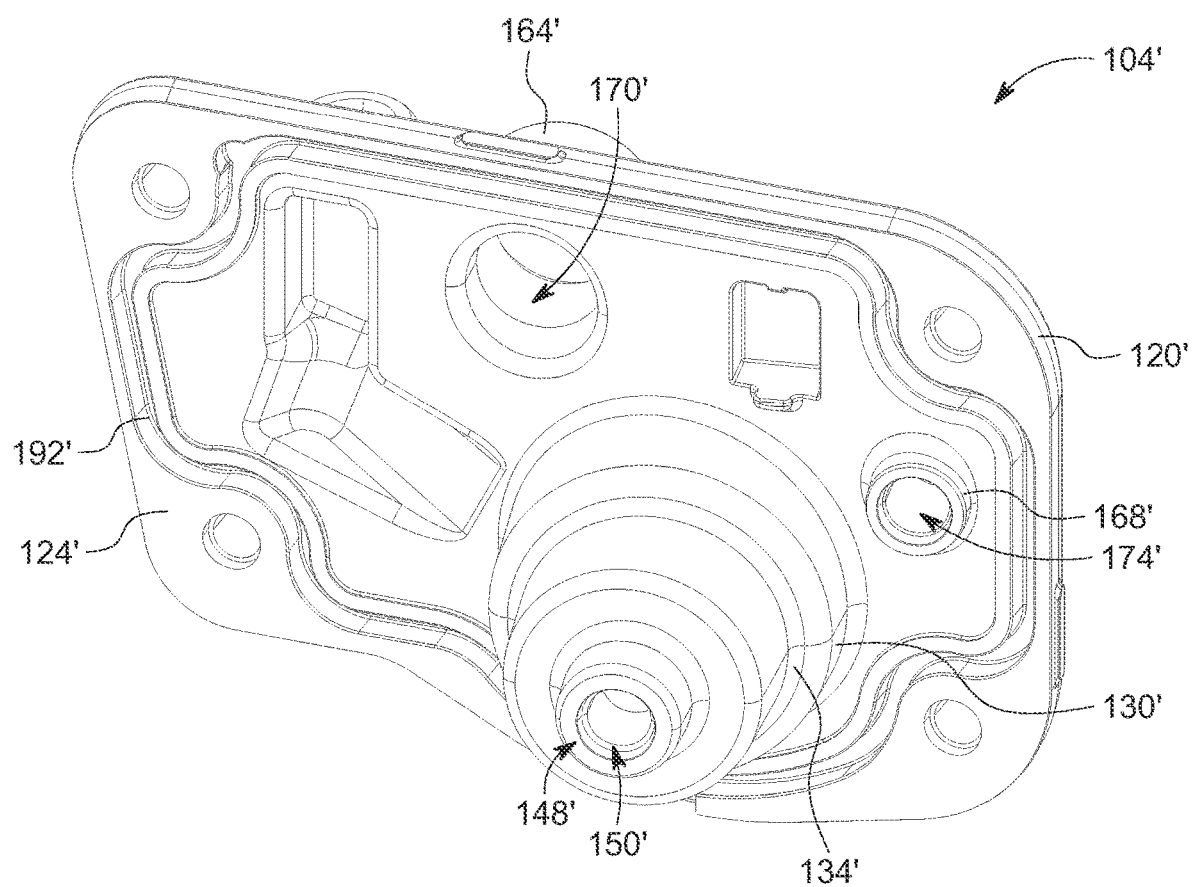
FIG. 12 illustrates a bottom perspective view of the mounting plate of FIG. 11 of the diesel fuel-supply assembly of FIG. 7.
Figure 13:
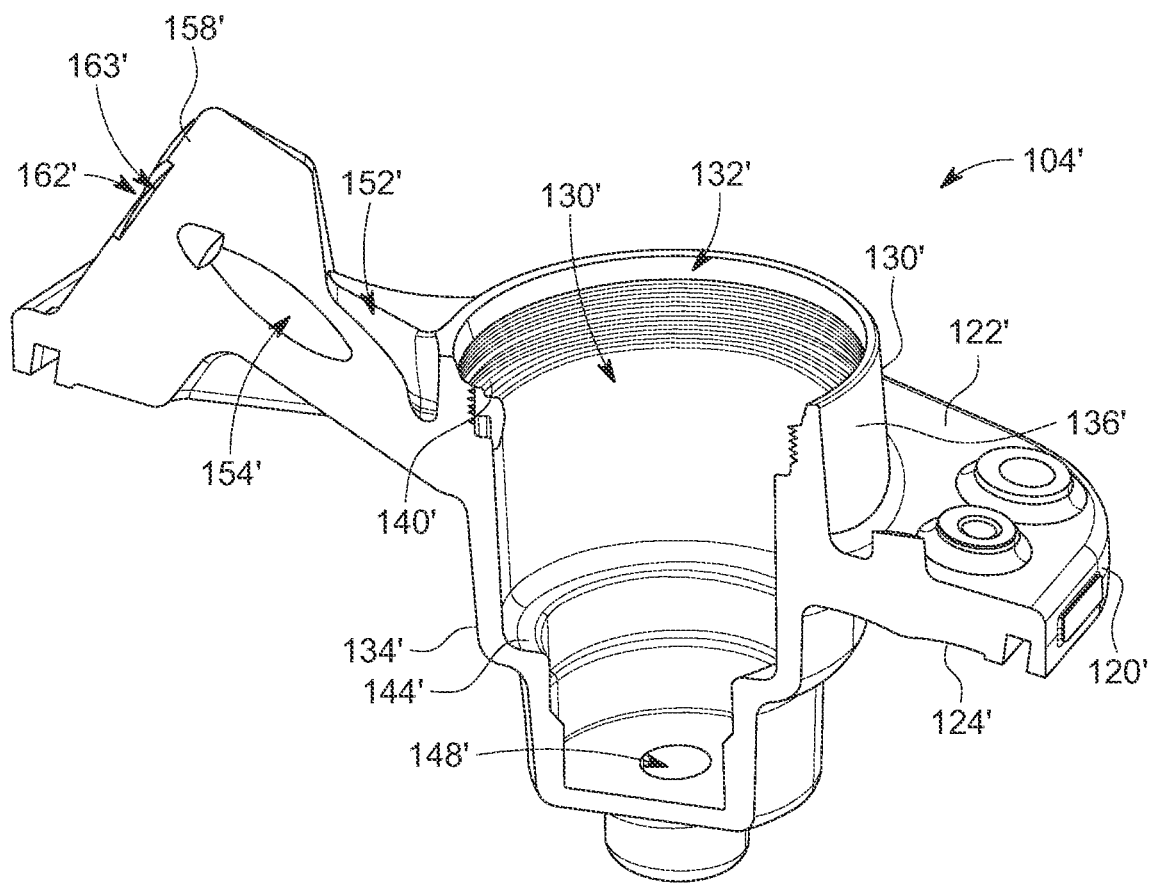
FIG. 13 illustrates a sectional perspective view of the mounting plate of FIG. 11 of the diesel fuel-supply assembly of FIG. 7 depicting a passage of a fuel-delivery conduit of the mounting plate.

Referring to FIGS. 11 to 13, the mounting plate 104' includes a base structure 120' having a first side 122' (also referred to as a top side 122') and a second side 124' (also referred to as bottom side 124') arranged opposite to the first side 122', and a cavity 126' or a chamber arranged substantially centrally to the base structure 120' and adapted to receive and support the fuel filter 108'. As shown in FIG. 10, the fuel filter 108' may generally be a cylindrical fuel filter defining a central channel to receive the fuel from the fuel-supply tank and adapted to filter the fuel as the fuel moves through the fuel filter 108' in a radial direction. A shape, size, and material of the fuel filter 108' is selected such that the fuel filter 108' is able to filter impurities from a diesel fuel.

In an embodiment, referring back to FIGS. 11 to 13, the cavity 126' may be defined by a boss, for example, a first boss 130', having an access opening 132' (shown in FIGS. 11 and 13) defined at the first side 122' of the base structure 120' to facilitate an insertion or removal of the fuel filter 108' from the cavity 126'. As shown, the first boss 130' extends outwardly of the base structure 120' and around a central axis of the cavity 126', and includes a first portion 134' (majority portion) disposed on the second side 124', and a second portion 136' (minority portion) arranged at the first side 122' of the base structure 120'. As illustrated, the second portion 136' defines the access opening 132', and may include a threaded structure 140' to enable a securing of a cap 142' (shown in FIGS. 8 to 10) to the base structure 120' and the fuel filter 108' to cover the access opening 132'. The cap 142' facilitates a retention of the fuel filter 108' within the cavity 126'. In some embodiments, the cap 142' may be integrally formed with the fuel filter 108'. Further, the first portion 134' may define a seat 144' (shown in FIGS. 10 and 13) disposed inside the cavity 126' and extending radially inside the cavity 126'. In an assembly, the fuel filter 108' is spaced off the seat 144' when disposed inside the cavity 126' such that the central channel of the fuel filter 108' is aligned with an inlet conduit 148' defined by the first portion 134' and extending from a free end of the first portion 134' to the cavity 126'. The inlet conduit 148' provides a passage of the fuel from an inlet port 150' to the central channel of the fuel filter 108'. In some embodiments, the first boss 130' may define one or more circular grooves to receive one or more seals to prevent a leakage of the fuel. In some implementations, the one or more seals are arranged on the fuel filter 108' and cooperates with the inner surface of the first boss 130' or one or more features provided on the inner surface of the first boss 130' to prevent a leakage of the fuel. Additionally, the diesel fuel-supply assembly 102' may include an inlet tube 190' (best shown in FIG. 7) connected to the inlet port 150' of the cavity 126'.

Moreover, the mounting plate 104' includes a fuel-delivery conduit 152' arranged at the first side 122' and extending outwardly of the base structure 120'. The fuel-delivery conduit 152' defines a passage 154' (shown in FIG. 13) extending along a length of the fuel-delivery conduit 152'. The passage 154' is in fluid communication with the cavity 126', and hence the fuel filter 108', and facilitates a passage of the fuel from the fuel filter 108' to the internal combustion engine. As shown, the fuel-delivery conduit 152' includes a first end portion 156' and a second end portion 158', each arranged distally from the cavity 126'. The first end potion 156' defines a first fuel outlet position for the fuel-delivery conduit 152', while the second end portion 158' defines a second fuel outlet position for the fuel-delivery conduit 152'. As shown, an opening, for example, a first outlet port 160' is defined at the first outlet position and an opening, for example, a second outlet port 162' is defined at the second outlet position. In an embodiment, the diesel fuel engine is a certified diesel fuel engine. In such a case, the second outlet port 162' defines a fuel outlet port 163' that facilitates an exit of the fuel from the diesel fuel-supply assembly 102', and a conduit 167' (shown in FIGS. 7 to 9) that enables a flow of fuel from the diesel fuel-supply assembly 102' to the diesel engine connected to the second end portion 158'. Also, in such a case, the first outlet port 160' is closed via a plug. In an embodiment, the diesel fuel engine is a non-certified diesel fuel engine. In such a case, first outlet port 162' acts as a fuel outlet port that facilitates an exit of the fuel from the diesel fuel-supply assembly 102', and a conduit that enables a flow of fuel from the diesel fuel-supply assembly 102' to the diesel engine connected to first end portion 156'. Further, in such a case, the second outlet port 162' is plugged using a plug.

Additionally, the mounting plate 104' includes a first mount structure 164', a second mount structure 166', and a third mount structure 168' extending from the base structure 120' and arranged at the first side 122' of the base structure 120'. As shown, the first mount structure 164' defines an opening, for example, a first aperture 170' (shown in FIG. 11), extending through the base structure 120' from the first side 122' to the second side 124'. The first aperture 170' facilitates an extension of the fuel sender 110' of the diesel fuel-supply assembly 102' from the first side 122' to the second side 124', and hence facilitates an insertion and removal of the fuel sender 110' inside the fuel-supply tank without disengaging the mounting plate 104' from the fuel-supply tank. In an embodiment, the first mount structure 164' may include an engagement structure, for example, a threaded structure, arranged on the first side 122' of the base structure 120' to secure and engage the fuel sender 110' with the first mount structure 164'. Although the threaded structure is contemplated as the engagement structure, it may be appreciated that any other type of engagement structure that facilitates the retention of the fuel sender 110' with the mounting plate 104' is also possible. In some embodiments, the fuel sender 110' may be press fitted within the first aperture 170', thereby securing or engaging the fuel sender 110' with the first mount structure 164'. The fuel sender 110' includes a level sensor to monitor a level of the fuel inside the fuel-supply tank.

As shown, the third mount structure 168' defines an opening, for example, a return aperture 174', extending through the base structure 120' from the first side 122' to the second side 124'. The return aperture 174' facilitates an extension of the fuel-return conduit 114' of the diesel fuel-supply assembly 102' from the first side 122' to the second side 124'. In the embodiment, the fuel-return conduit 114' is engaged with a portion of the third mount structure 168' arranged on the second side 124' of the base structure 120' using suitable connectors. However, it may be envisioned that the fuel-return conduit 114' may be mounted to the mounting plate 104' by engaging the fuel-return conduit 114' to a portion of the third mount structure 168' arranged on the first side 122' of the base structure 120' with suitable connector. In such a case the fuel-return conduit 114' may be inserted inside the fuel-supply tank or removed from the fuel-supply tank without disengaging the mounting plate 104' from the fuel-supply tank. The fuel-return conduit 114' receives the fuel from a fuel injection system, such as, common rail injection system, of the diesel engine and supplies the fuel back to the fuel-supply tank. In an embodiment, the third mount structure 168' may include an engagement structure, for example, a threaded structure, arranged on the first side 122' of the base structure 120' to secure and engage the fuel-return conduit 114' with the third mount structure 168'. Although the threaded structure is contemplated as the engagement structure, it may be appreciated that any other type of engagement structure that facilitates the retention of the fuel-return conduit 114' with the mounting structure is also possible. In some embodiments, the fuel-return conduit 114' may be press fitted within the return aperture 174', thereby securing or engaging the fuel-return conduit 114' with the third mount structure 168'. Also, the mounting plate 104' may include a sealing groove 192' (shown in FIG. 12) arranged on the second side 124' of the base structure 120' and extending along a periphery of the base structure 120'. The sealing groove 192' is adapted to receive a sealing ring to facilitate sealing of the base structure 120' with the fuel-supply tank.

Figure 14:
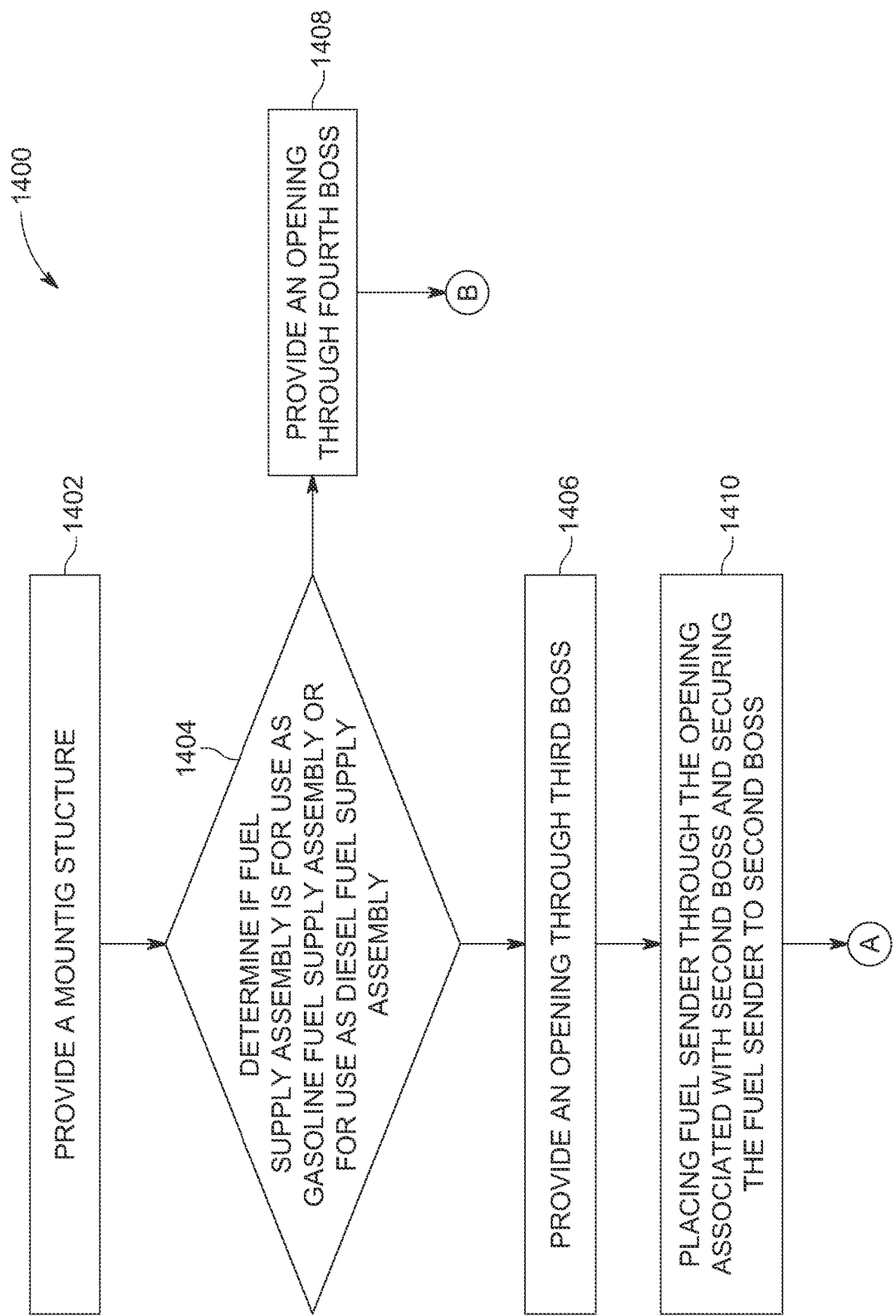
FIG. 14 illustrates a method of assembly a fuel-supply assembly of an internal combustion engine, in accordance with an example embodiment.
Figure 14:
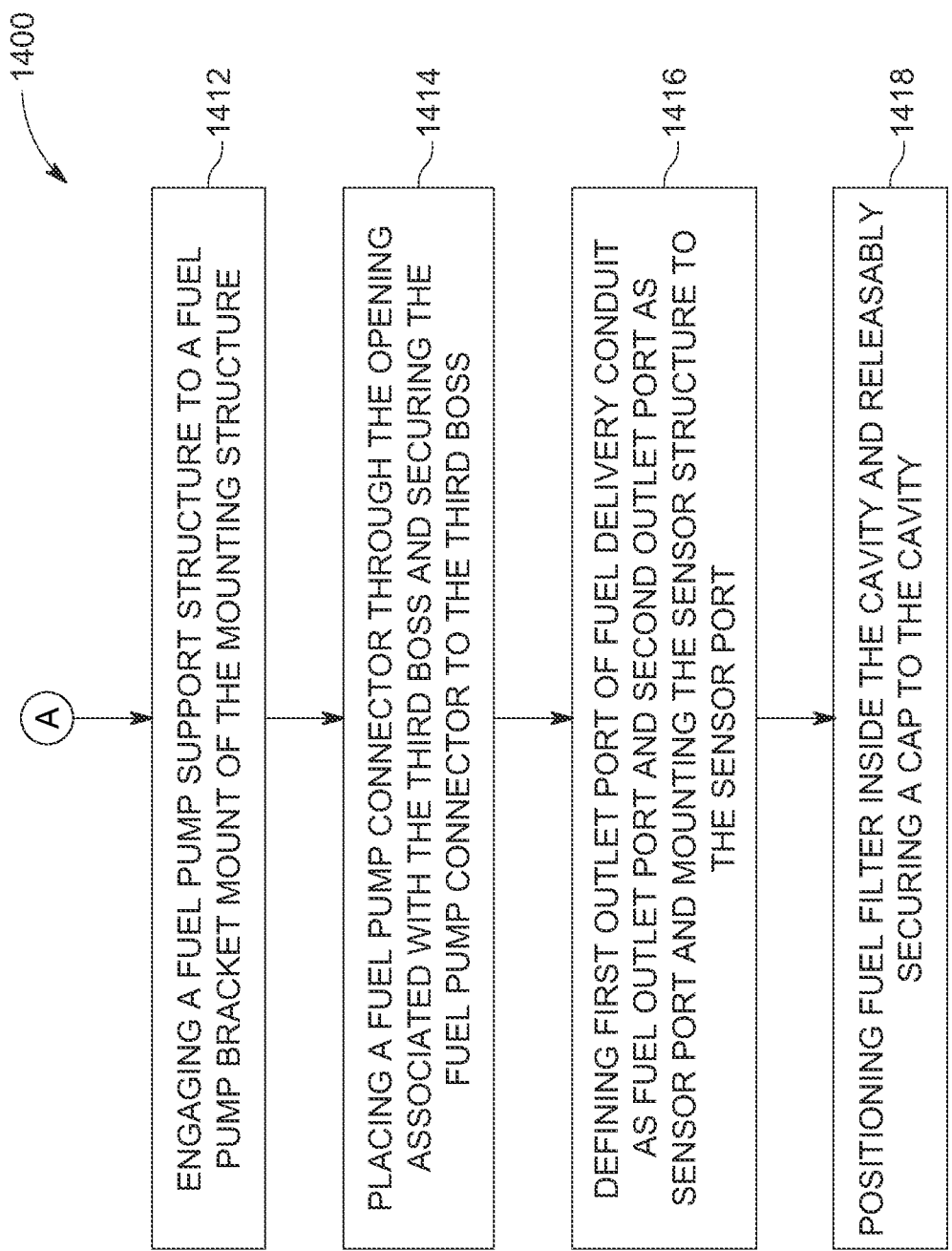
Figure 14:
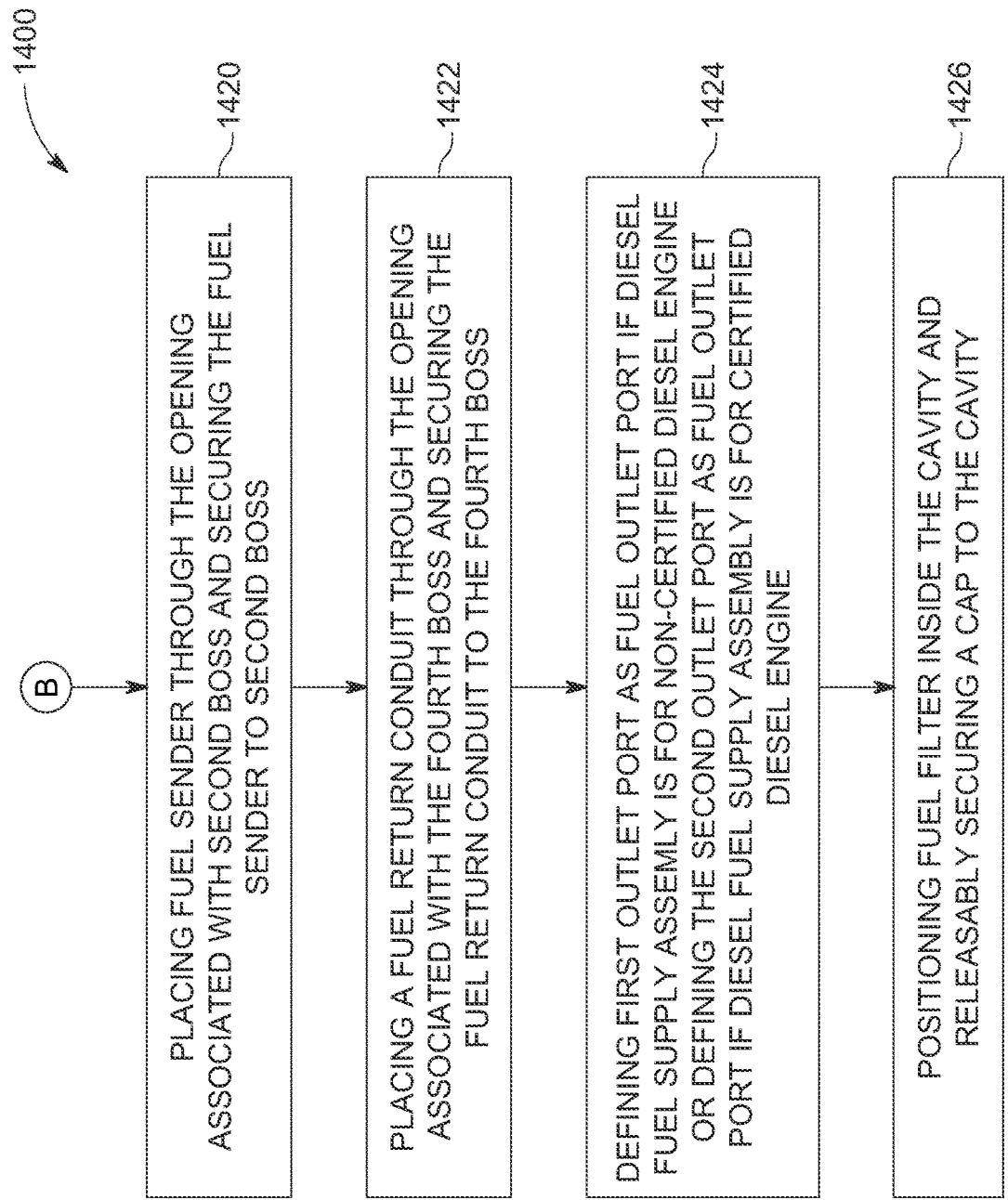
Figure 15:
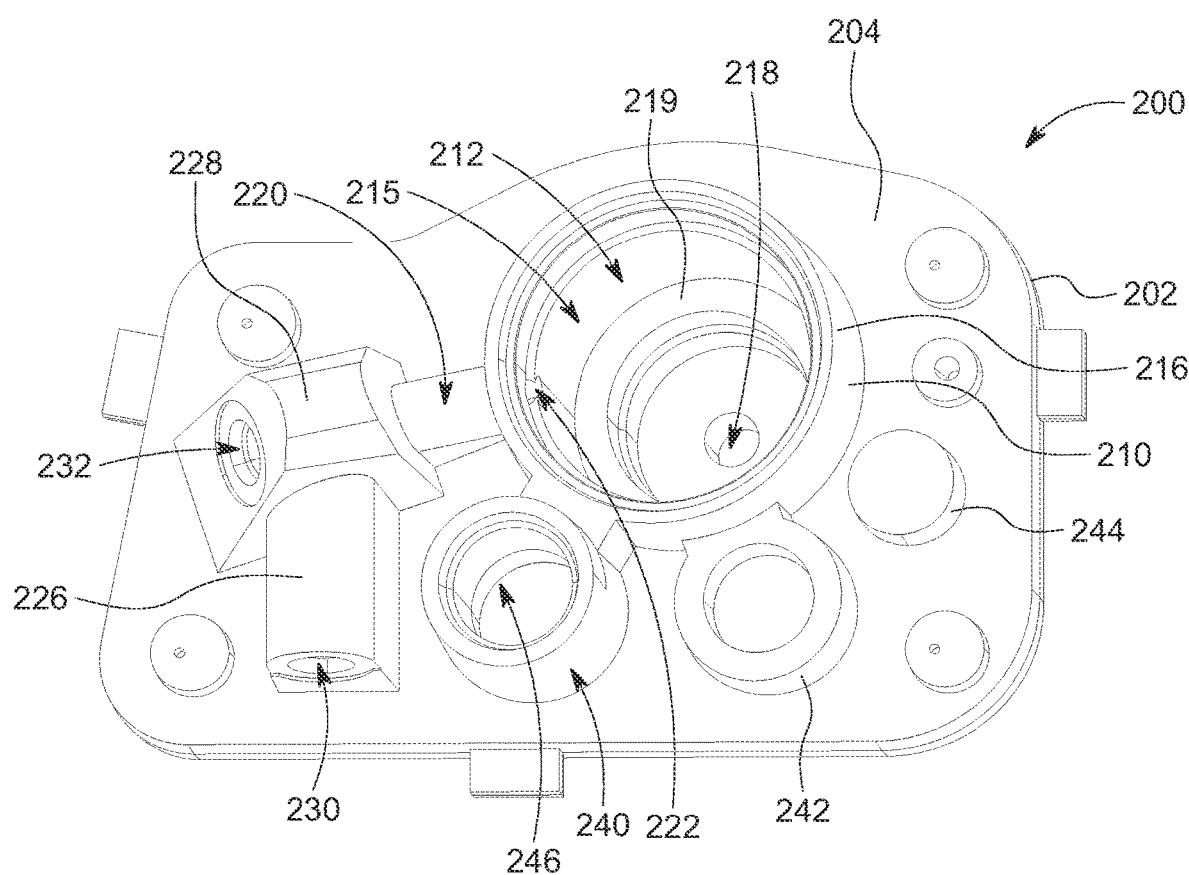
FIG. 15 illustrates a top perspective view of a mounting structure, in accordance with an embodiment.
Figure 16:
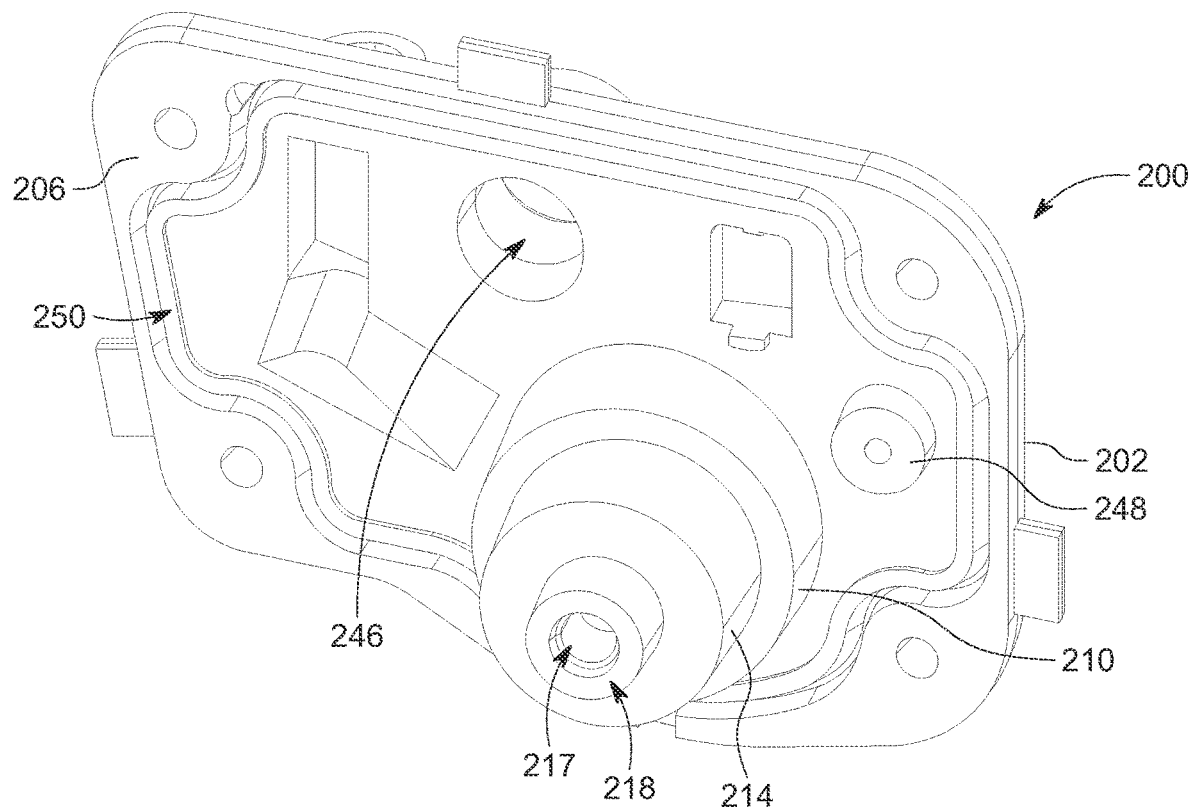
FIG. 16 illustrates a bottom perspective view of the mounting structure of FIG. 15.
Figure 17:
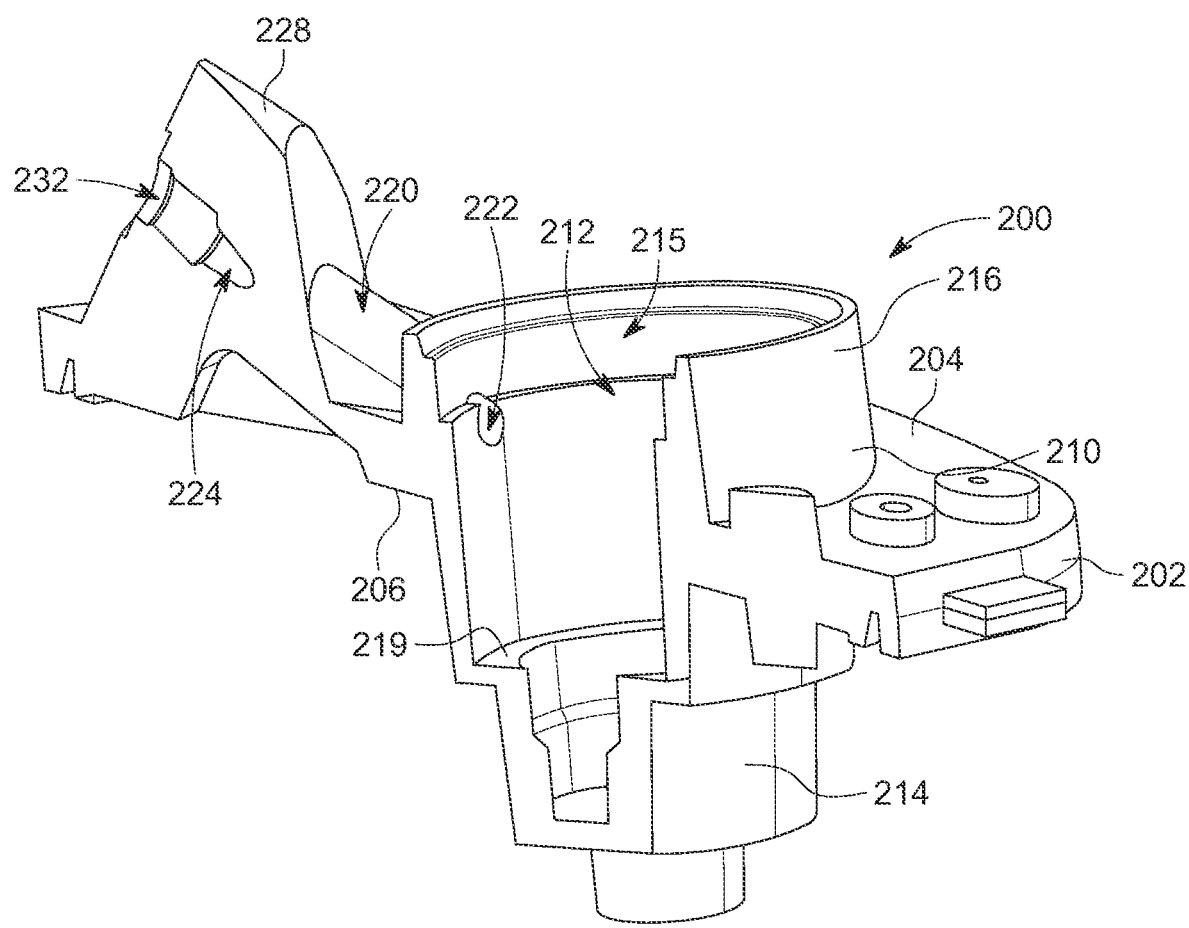
FIG. 17 illustrates a sectional perspective view of the mounting structure of FIG. 15 depicting a passage of a fuel-delivery conduit of the mounting structure.

Referring to FIG. 14, a method 1400 for assembling a fuel-supply assembly 100, 100', for example, a gasoline fuel-supply assembly 102 and/or the diesel fuel-supply assembly 102', is described. The method 1400 includes a step 1402 in which a mounting structure 200 (shown in FIGS. 15 to 17) is provided. In an embodiment, the mounting structure 200 is formed or manufactured by casting. As shown, the mounting structure 200 includes a plate structure 202 having a first side 204 (i.e., top side 204) and a second side 206 (i.e., bottom side 206) arranged opposite to the first side 204, and a first boss 210 extending from the plate structure 202 and defining a cavity 212. As illustrated, the first boss 210 may be located centrally to the plate structure 202 and may include a first portion 214 extending outwardly from the second side 206 of the plate structure 202 and a second portion 216 extending outwardly from the first side 204 of the plate structure 202. The second portion 214 defines an access opening 215 of the cavity 212, while the first portion 214 defines an inlet conduit 218 having an inlet port 217, and a seat 219 for the filter. The cavity 212 is adapted to receive a fuel filter to filter the fuel.

Additionally, the mounting structure 200 includes a fuel-delivery conduit 220 having an inlet opening 222 in communication with the cavity 212 to receive the filtered fuel, a passage 224 (shown in FIG. 17) defined through the plate structure 202, a first end portion 226 extending outwardly of the first side 204 of the plate structure 202, and a second end portion 228 extending outwardly of the first side 204 of the plate structure 202 and arranged at an angle relative to the first end portion 226. The first end portion 226 defines a first outlet position and defines first outlet port 230 that communicates with the passage 224, and the second end portion 228 defines a second outlet position and defines a second outlet port 232 that also fluidly communicates with the passage 224. Moreover, the mounting structure 200 includes a second boss 240, a third boss 242, and a fourth boss 244, each extending outwardly of the plate structure 202. In an embodiment, each of the second boss 240, the third boss 242, and the fourth boss 244 may be arranged at the first side 204 of the plate structure 202 and extends outwardly from the first side 204 of the plate structure 202. In an embodiment, the second boss 240 may define an opening, for example, a first aperture 246 extending through the plate structure 202 from the first side 204 to the second side. Although the first aperture 246 formed during the casting of the mounting structure 200 is shown and contemplated, it may be appreciated the first aperture 246 may be provided by drilling or machining through the second boss 240. Further, the mounting structure 200 may include a fuel pump bracket mount 248 arranged on the second side 206 of the plate structure 202 and extending outwardly of the plate structure 202.

The method 1400 also includes a step 1404 at which an operator determines whether the fuel-supply assembly is for use as the gasoline fuel-supply assembly 102 or the fuel-supply assembly is for use as the diesel fuel-supply assembly 102'. In an embodiment, the operator may determine the type of fuel-supply assembly by referring to a production schedule of the assembling line or plant. The method 1400 moves to a step 1406 if the fuel-supply assembly is for use as the gasoline fuel-supply assembly 102 else the method 1400 moves to a step 1408 if the fuel-supply assembly is for use as the diesel fuel-supply assembly 102'.

At the step 1406, the operator may provide an opening, for example, the connector aperture 174, through the third boss 242 and the plate structure 202. In an embodiment, the connector aperture 174 may be formed by drilling or machining through the third boss 242 and the associated portion of the plate structure 202. Accordingly, the operator may provide the opening (i.e., the connector aperture 174) such that the opening (i.e., the connector aperture 174) extends from the first side 204 to the second side 206 of the plate structure 202. Accordingly, the connector aperture 174 in the second mount structure 166 of the gasoline fuel-supply assembly 102 is formed.

Additionally, at the step 1406, the operator may form threaded structures inside the first outlet port 230 and the second outlet port 232 to enable a mounting of conduit adapted to supply fuel to the gasoline engine and the sensor 112. In the illustrated embodiment, the first outlet port 230 and the second outlet port 232 are formed during the casting of the mounting structure 200. However, it may be appreciated that the first outlet port 230 and/or the second outlet port 232 may be formed by drilling or machining holes through the first end portion 226 and/or the second end portion 228. Additionally, the operator may form the threaded structure 140 at the second portion 216 of the first boss 210 and inside the cavity 212. In some embodiments, the operator may provide a sealing groove 250 around a circumference of the plate structure 202. The sealing groove 250 may be provided by machining the plate structure 202. Alternatively, the sealing groove 250 may be provided during the casting of the mounting structure 200. In some embodiments, the sealing groove 250 may be converted into the sealing groove 192 by performing a machining operation on the casted sealing groove 250. In this manner, the mounting plate 104 is formed from the mounting structure 200. Accordingly, the first boss 210, the first portion 214, the second portion 216, and the cavity 212 of the mounting structure 200 respectively define the first boss 130, the first portion 134, the second portion 136, and the cavity 126 of the mounting plate 104. Further, the plate structure 202 of the mounting structure 200 defines the base structure 120 of the mounting plate 104 and the sides 204, 206 of the plate structure 202 defines the sides 122, 124 of the base structure 120. Similarly, the seat 219, the inlet conduit 218, the inlet port 217 of the mounting structure 200 defines the seat 144, the inlet conduit 148, and the inlet port 150 of the mounting plate 104. Moreover, the fuel-delivery conduit 220, the passage 224, the first end portion 226, the second end portion 228, the first outlet port 230, and the second outlet port 232 respectively define the first delivery conduit 152, the passage 154, the first end portion 156, the second end portion 158, the first outlet port 160, and the second outlet port 162 of the mounting plate 104. Also, the second boss 240 and the first aperture 246 respectively define the first mount structure 164 and the first aperture 170 of the mounting plate 104. Further, the fuel pump bracket mount 248 defines the fuel pump bracket mount 182 of the mounting plate 104, and the sealing groove 250 defines the sealing groove 192.

The method 1400 also includes a step 1410 at which the operator secures or engages the fuel sender 110 to the first mount structure 164 (i.e., the second boss 240) of the mounting plate 104. For so doing, the operator may extend the fuel sender 110 through the first aperture 170 and engages/attaches the fuel sender 110 to the first mount structure 164.

Additionally, the method 1400 includes a step 1412 at which the operator secures and engages a fuel pump support structure 180 to the fuel pump bracket mount 182 (i.e., the fuel pump bracket mount 248). The operator secures the fuel pump support structure 180 to the fuel pump bracket mount 182 of the mounting plate 104, such that the fuel pump support structure 180 may extend downwardly and outwardly from the second side 124 of the base structure 120, as shown in FIG. 1. Subsequently, or otherwise, the operator may secure and engage the fuel pump 106 to the fuel pump support structure 180. In this manner, the operator may engage or secure the fuel pump 106 with the mounting plate 104 such that the fuel pump 106 is arranged facing the second side 124 of the base structure 120.

The method 1400 also includes a step 1414 at which the operator may secure the fuel pump connector 176 to the second mount structure 166 (i.e., the third boss 242) and the connector aperture 174 of the mounting plate 104. For so doing, the operator may extend the fuel pump connector 176 through the connector aperture 174 and secures the fuel pump connector 176 with the second mount structure 166, and hence to the third boss 242, by using a suitable connector. In an embodiment, the operator may tie the fuel pump connector 176 to the fuel pump support structure 180 using a circlip. The fuel pump connector 176 may include the electric supply cable to provide electric power to the fuel pump 106 for operating the fuel pump 106.

In an embodiment, the method 1400 includes a step 1416 at which the first outlet port 160 is defined as the fuel outlet port 163, while the second outlet port 162 is defined as the sensor port 165. The step 1416 also includes securing the sensor 112, for example, the temperature sensor and/or the pressure sensor to the mounting plate 104. For so doing, the operator may position the sensor 112, at least partially, inside the second outlet port 162 of the mounting plate 104, and connects or engages the sensor 112 with the second end portion 158 of the mounting plate 104 such that a portion of the sensor 112 extends inside the passage 154 of the mounting plate 104 to sense the temperature and/or the pressure of the fuel flowing through the passage 154. In an embodiment, a suitable connector may be utilized to secure the sensor 112 to the second end portion 158.

The method 1400 also includes a step 1418 of arranging/securing the fuel filter 108 with the mounting plate 104. For so doing, the operator may insert and position the fuel filter 108 inside the cavity 126. The fuel filter 108 is arranged inside the cavity 126 such that a central channel of the fuel filter 108 is aligned and in fluid communication with the inlet conduit 148 such that the fuel flows to the central channel from the fuel pump 106. The operator may insert the fuel filter 108 inside the cavity 126 through the access opening 132. After suitably arranging the fuel filter 108 inside the cavity 126 or otherwise, the operator may secure the cap 142 to the fuel filter 108 and the second portion 136 of the first boss 130. In an embodiment, the cap 142 may be in threaded engagement with both the fuel filter 108 and second portion 136 of the first boss 130, thereby ensuring a retention of the fuel filter 108 inside the cavity 126 and the mounting plate 104. To facilitate the flow of fuel from the fuel pump 106 to the fuel filter 108, the operator may connect the inlet tube 190 to a fuel pump outlet to the inlet conduit 148. Further, during assembling of the fuel filter 108 and other components with the mounting plate 104, the operator may install various sealing members at the appropriate positions to prevent a leakage of fuel. For example, in an embodiment, a sealing ring may be arranged inside the sealing groove 192. In this manner, the method facilitates assembling the gasoline fuel-supply assembly 102.

At the step 1408, the operator may provide an opening, for example, the return aperture 174', through the fourth boss 244 and the plate structure 202. In an embodiment, the return aperture 174' may be formed by drilling or machining through the fourth boss 244 and the associated portion of the plate structure 202. Accordingly, the operator may provide the opening (i.e., the return aperture 174') such that the opening (i.e., the return aperture 174') extends from the first side 204 to the second side 206 of the plate structure 202. Accordingly, a third mount structure 168' and the return aperture 174' of the diesel fuel-supply assembly 102' is formed. It may be appreciated that the return aperture 174' is shaped and sized to cooperate with the second mount structure for retaining the fuel-return conduit 114' with the plate structure 202.

Additionally, at the step 1408, the operator may form threaded structures inside the first outlet port 230 and the second outlet port 232 to enable a mounting of conduit adapted to supply the fuel to the diesel fuel engine. In the illustrated embodiment, the first outlet port 230 and the second outlet port 232 are formed during the casting of the mounting structure 200. However, it may be appreciated that the first outlet port 230 and/or the second outlet port 232 may be formed by drilling or machining holes through the first end portion 226 and/or the second end portion 228. Additionally, the operator may form the threaded structure 140' at the second portion 216 of the first boss 210 and inside the cavity 212. In some embodiments, the operator may provide a sealing groove 250 around a circumference of the plate structure 202. The sealing groove 250 may be provided by machining the plate structure 202. Alternatively, the sealing groove 250 may be provided during the casting of the mounting structure 200. In some embodiments, the sealing groove 250 may be converted into the sealing groove 192' by performing a machining operation on the casted sealing groove 250. In this manner, the mounting plate 104' is formed from the mounting structure 200. Accordingly, the first boss 210, the first portion 214, the second portion 216, and the cavity 212 of the mounting structure 200 respectively define the first boss 130', the first portion 134', the second portion 136', and the cavity 126' of the mounting plate 104'. Further, the plate structure 202 of the mounting structure 200 defines the base structure 120' of the mounting plate 104' and the sides 204, 206 of the plate structure 202 define the sides 122', 124' of the base structure 120'. Similarly, the seat 219, the inlet conduit 218, and the inlet port 217 of the mounting structure 200 define the seat 144', the inlet conduit 148', and the inlet port 150' of the mounting plate 104'. Moreover, the fuel-delivery conduit 220, the passage 224, the first end portion 226, the second end portion 228, the first outlet port 230, and the second outlet port 232 respectively define the first delivery conduit 152', the passage 154', the first end portion 156', the second end portion 158', the first outlet port 160', and the second outlet port 162' of the mounting plate 104'. Also, the second boss 240 and the first aperture 246 respectively define the first mount structure 164' and the first aperture 170' of the mounting plate 104', and the sealing groove 250 defines the sealing groove 192'.

The method 1400 also includes a step 1420 at which the operator secures or engages the fuel sender 110' to the first mount structure 164' (i.e., the second boss 240) of the mounting plate 104'. For so doing, the operator may extend the fuel sender 110' through the first aperture 170' and engages/attaches the fuel sender 110' to the first mount structure 164', and hence the first boss 240.

The method 1400 also includes a step 1422 at which the operator may secure the fuel-return conduit 114' to the third mount structure 168' and the return aperture 174' of the mounting plate 104', and hence to the fourth boss 242 of the mounting structure 200. For so doing, the operator may extend the fuel-return conduit 114' through the return aperture 174' and secures the fuel-return conduit 114' with the third mount structure 168' by using a suitable connector through the second side 122'.

In an embodiment, the method 1400 also includes a step 1424 of determining whether the diesel engine is a certified engine or a non-certified engine. In a scenario, the diesel engine is a certified diesel engine. In such a case, the second outlet port 162' is defined as the fuel outlet port 163' to supply the fuel from the diesel fuel-supply assembly 102' to the fuel injection system of the diesel engine. Also, in such a scenario, the first outlet port 160' is closed, for example, by attaching a plug, or remains closed, for example, if the first outlet port 160' was formed closed. In a scenario, the diesel engine is a non-certified engine. In such a case, the first outlet port 160' is defined as the fuel outlet port to supply the fuel from the diesel fuel-supply assembly 102' to the fuel injection system of the diesel engine. Also, in such a scenario, the second outlet port 162' is closed, for example, by attaching a plug, or remains closed. Although, the first outlet port 160' is defined as the fuel outlet port for the non-certified diesel engine, it may be appreciated that second outlet port 162' may also be defined as the fuel outlet port for the non-certified engine. In such a case, the first outlet port 160' is closed.

The method 1400 also includes a step 1426 of arranging/securing the fuel filter 108' with the mounting plate 104'. For so doing, the operator may insert and position the fuel filter 108' inside the cavity 126'. The fuel filter 108' is arranged inside the cavity 126' such that a central channel of the fuel filter 108' is aligned and in fluid communication with the inlet conduit 148' such that the fuel flows to the central channel from the fuel-supply tank. The operator may insert the fuel filter 108' inside the cavity 126' through the access opening 132'. After suitably arranging the fuel filter 108' inside the cavity 126' or otherwise, the operator may secure the cap 142' to the fuel filter 108' and the second portion 136' of the first boss 130'. In an embodiment, the cap 142' may be in threaded engagement with both the fuel filter 108' and second portion 136" of the first boss 130', thereby ensuring a retention of the fuel filter 108' inside the cavity 126' and the mounting plate 104'. To facilitate the flow of fuel to the fuel filter 108', the operator may connect the inlet tube 190' to the inlet conduit 148'. Further, during assembling of the fuel filter 108' and other components with the mounting plate 104', the operator may install various sealing members at the appropriate positions to prevent a leakage of fuel. For example, in an embodiment, a sealing ring may be arranged inside the sealing grove 192'. In this manner, the method facilitates in assembly the diesel fuel-supply assembly 102'.

Figure 18:
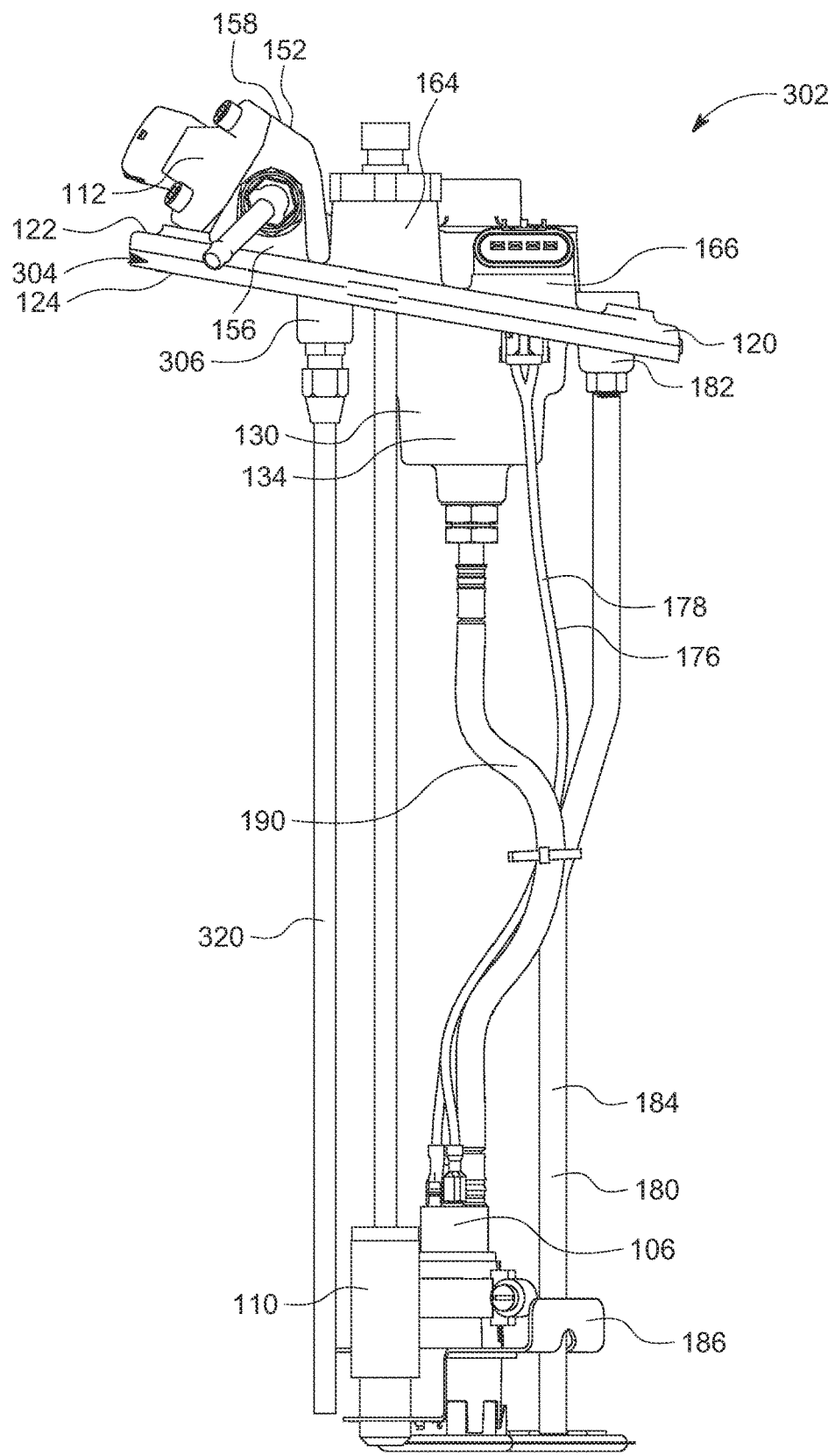
FIG. 18 illustrates a front perspective view of an example gasoline fuel-supply assembly for an internal combustion engine, in accordance with an embodiment.
Figure 19:
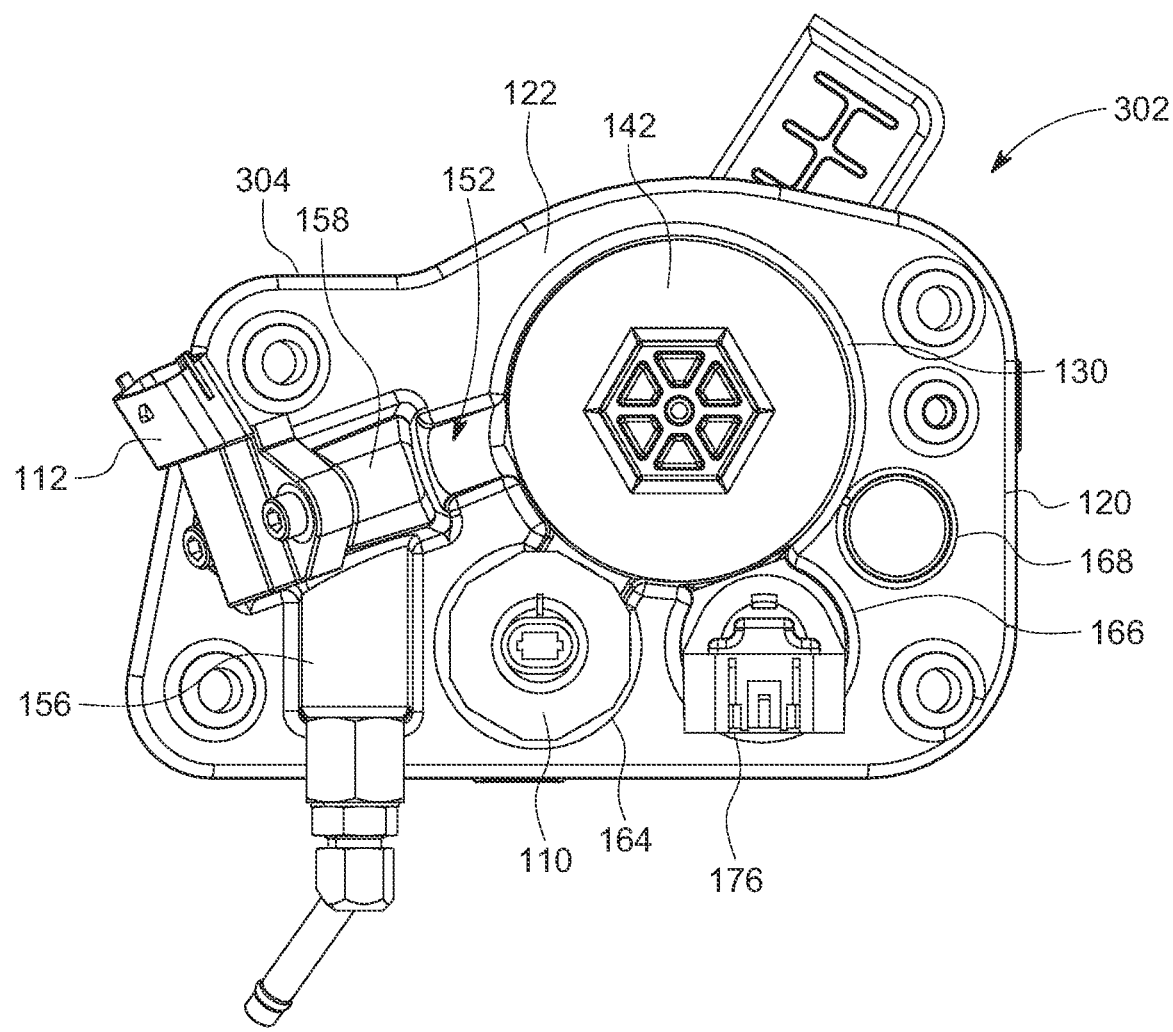
FIG. 19 illustrates a top view of the gasoline fuel-supply assembly of FIG. 18.
Figure 20:
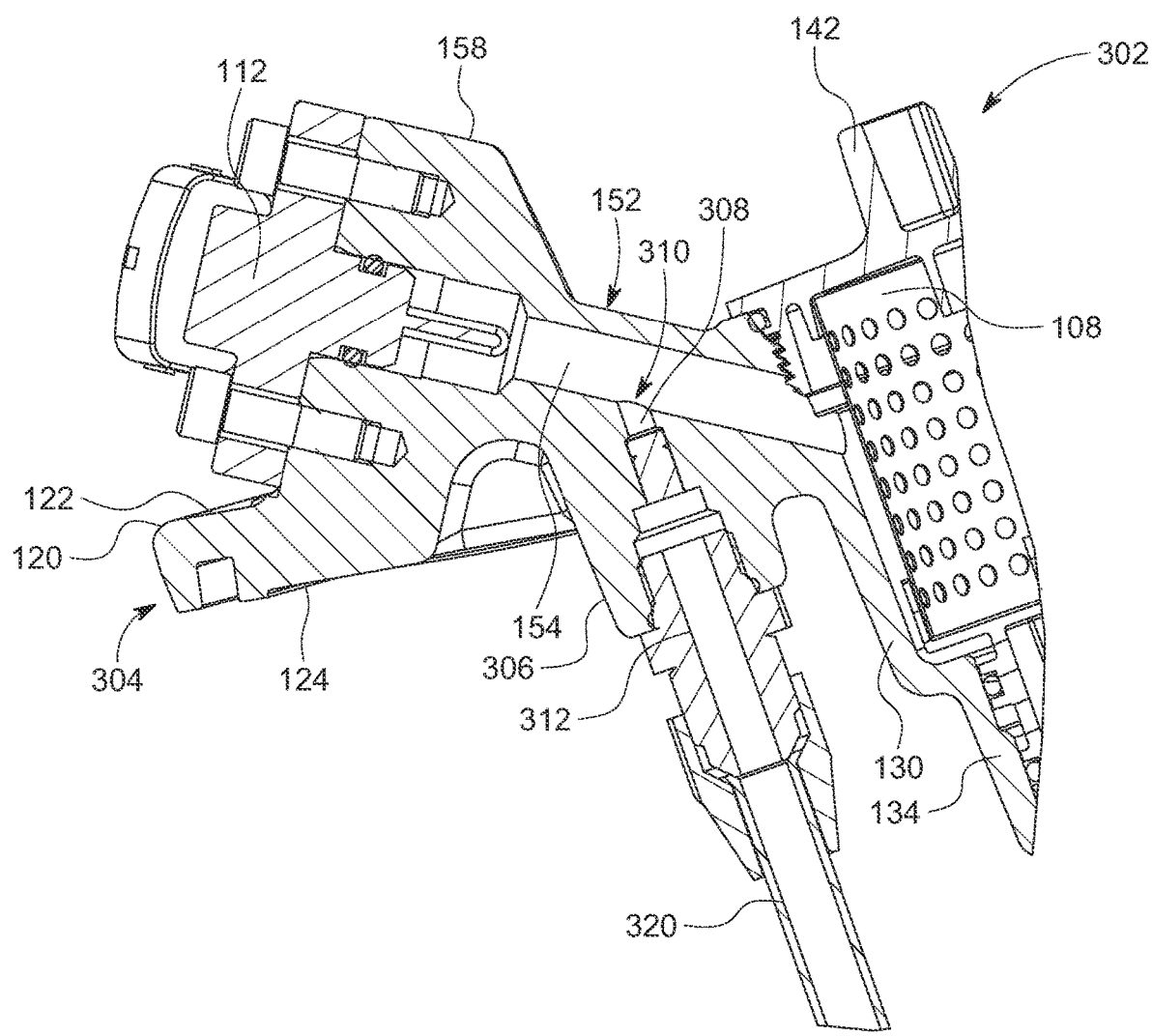
FIG. 20 illustrates a sectional view of the gasoline fuel-supply assembly of FIG. 18 depicting a relief valve secured to a fourth mount structure.
Figure 21:
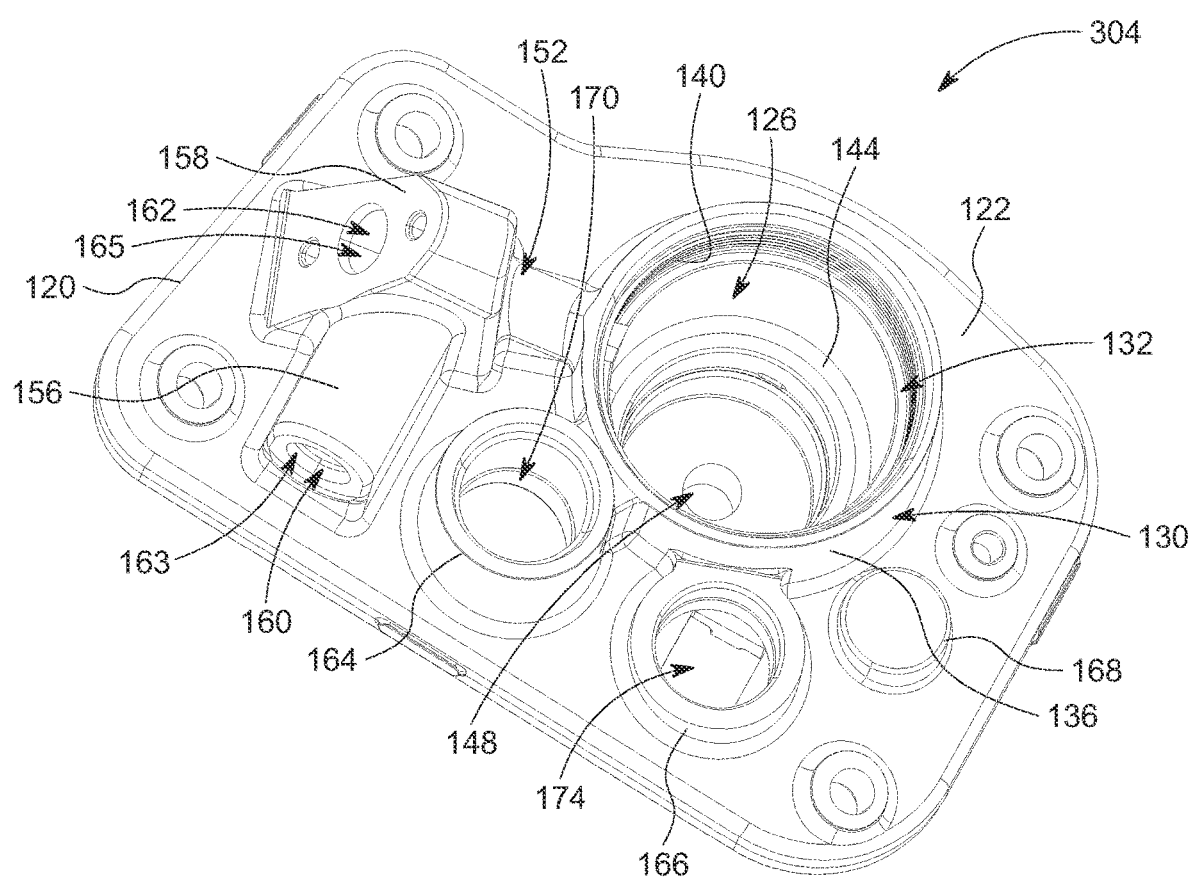
FIG. 21 illustrates a top perspective view of a mounting plate of the gasoline fuel-supply assembly of FIG. 18.
Figure 22:
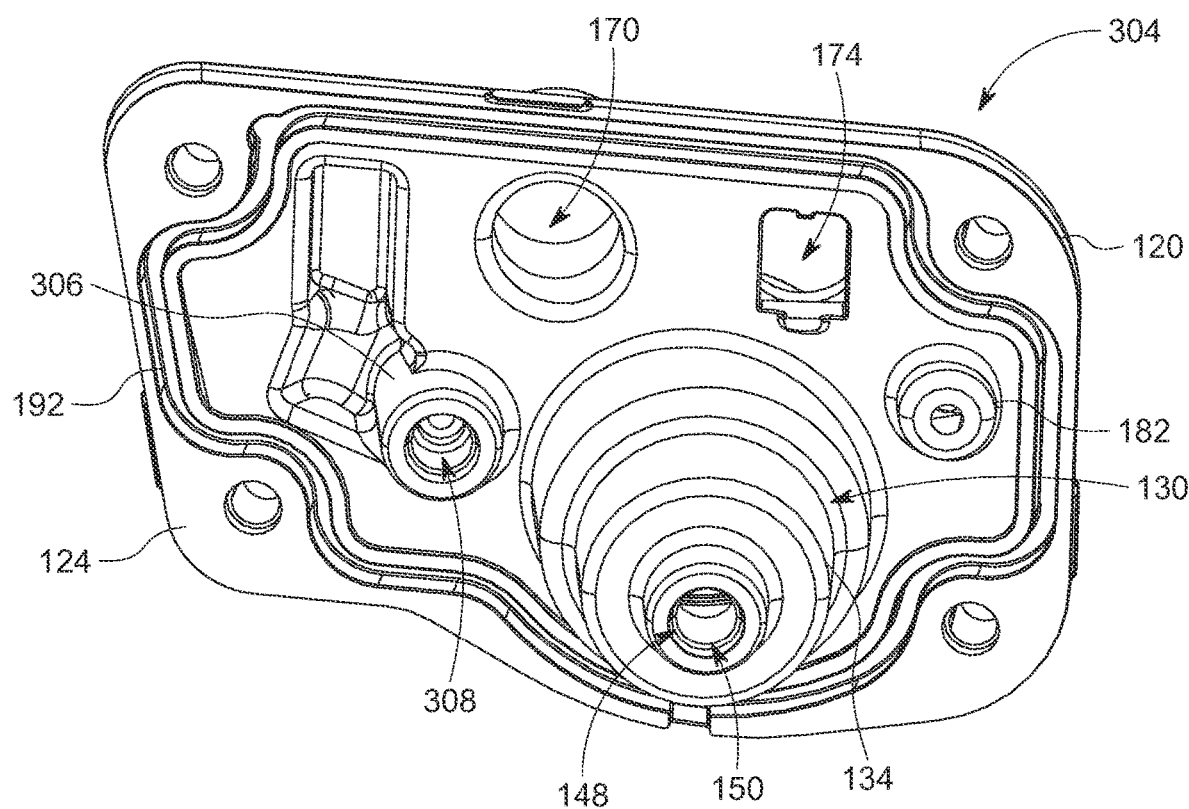
FIG. 22 illustrates a bottom perspective view of the mounting plate of FIG. 21 of the gasoline fuel-supply assembly of FIG. 18.
Figure 23:
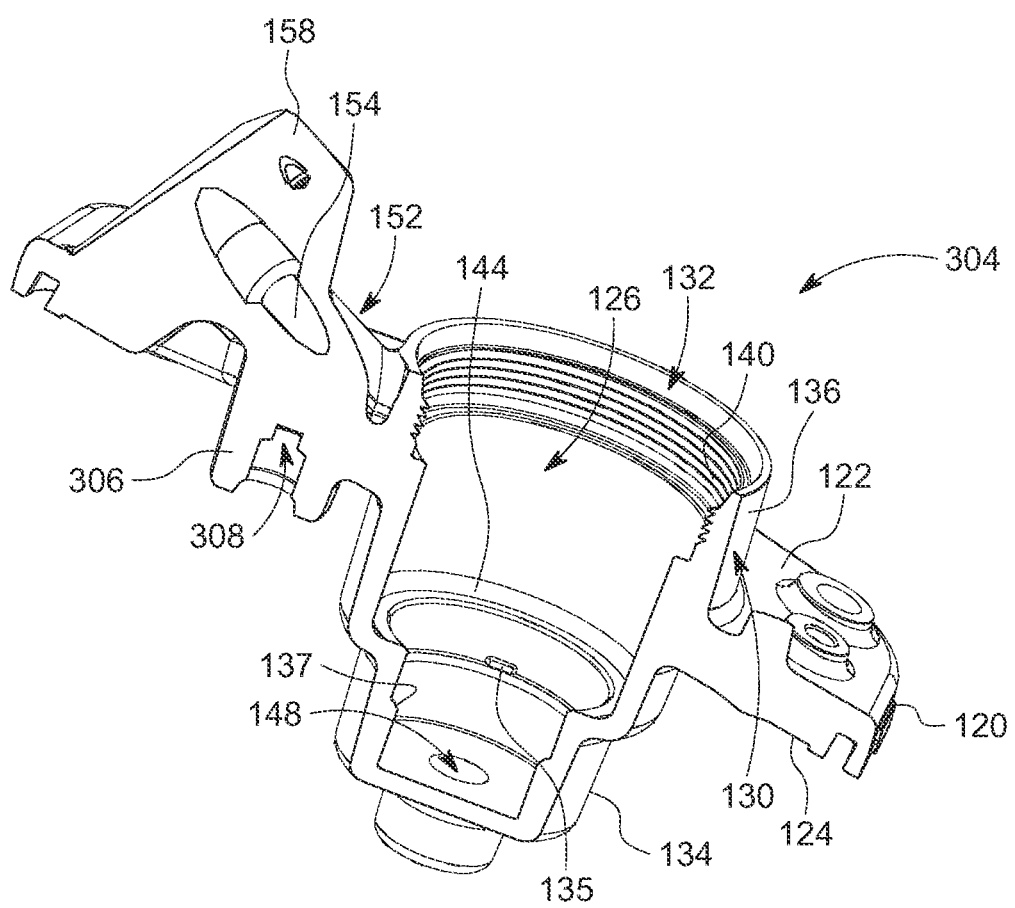
FIG. 23 illustrates a sectional perspective view of the mounting plate of FIG. 21 of the gasoline fuel-supply assembly of FIG. 18 depicting a passage of a fuel-delivery conduit of the mounting plate.
Figure 24:
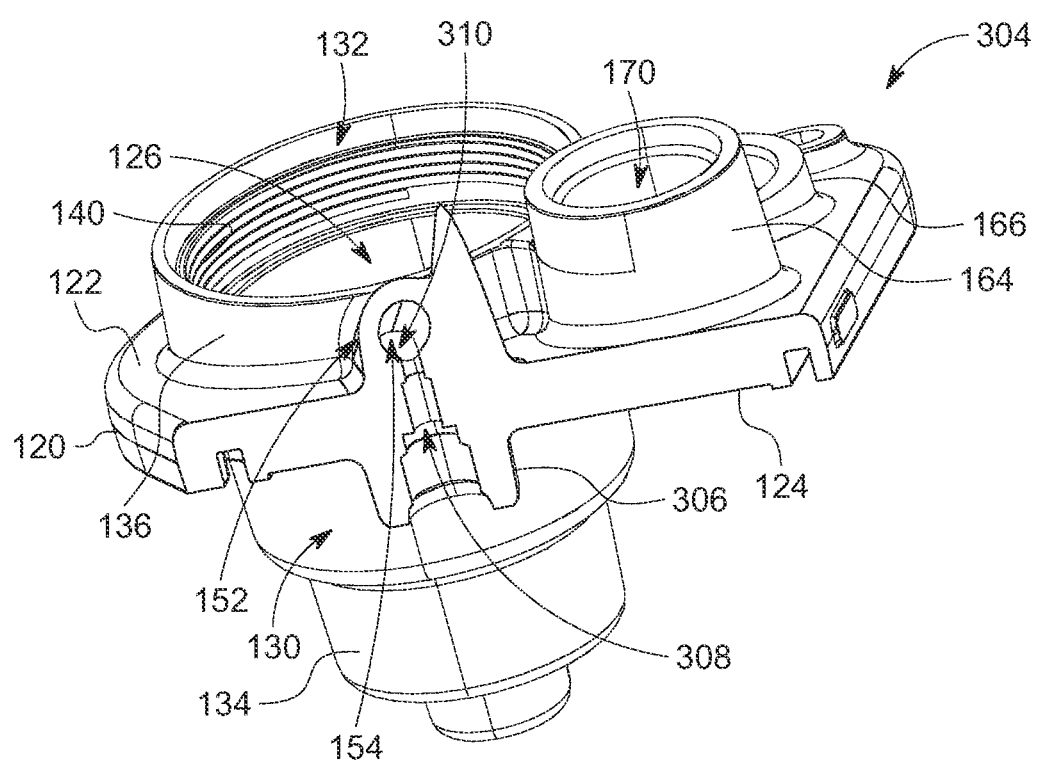
FIG. 24 illustrates a sectional perspective view of the mounting plate of FIG. 21 of the gasoline fuel-supply assembly of FIG. 18 depicting an elongated opening associated with the fourth mount structure intersecting with the passage.
Figure 25:
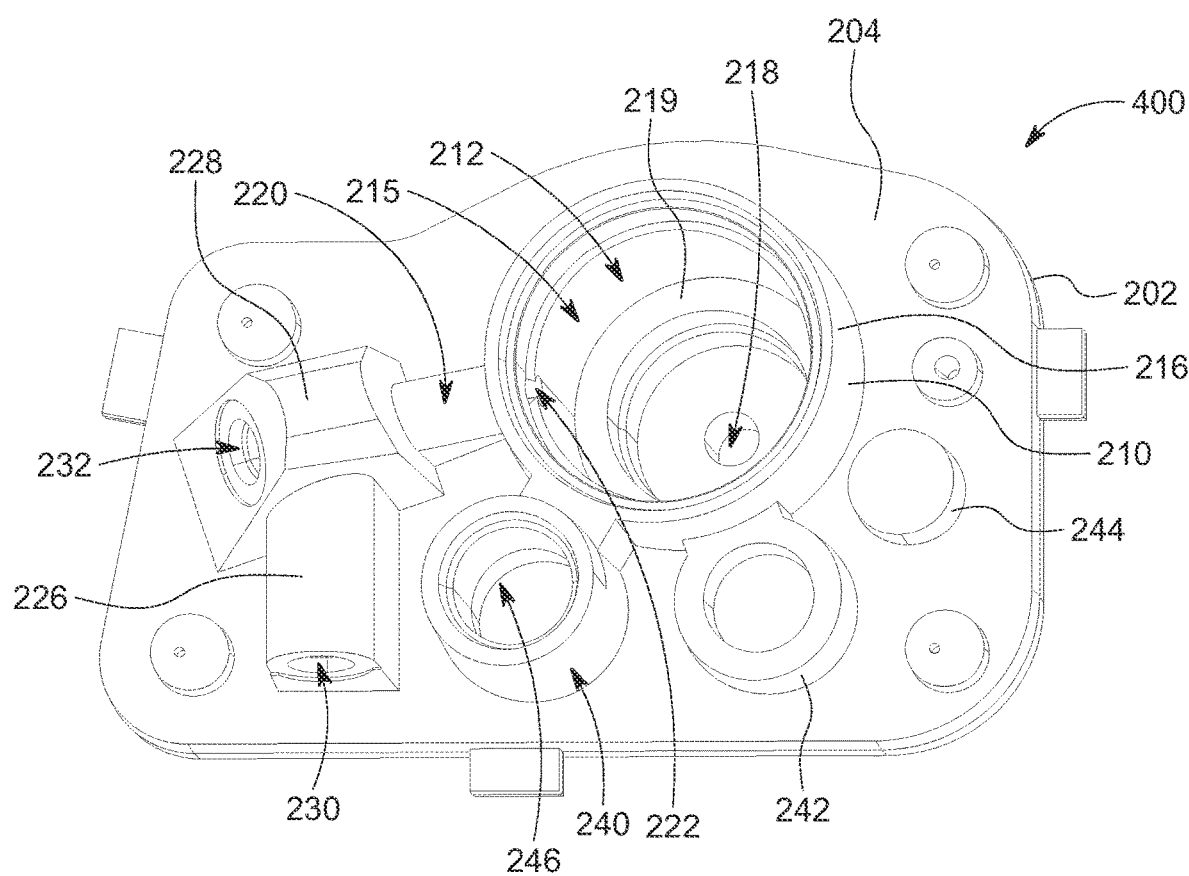
FIG. 25 illustrates a top perspective view of a mounting structure, in accordance with an embodiment.

Referring to FIGS. 18-20, a gasoline fuel-supply assembly 302 is shown according to an alternative embodiment of the present disclosure. The gasoline fuel-supply assembly 302 is similar to the gasoline fuel-supply assembly 102 except that a mounting plate 304 (best shown in FIGS. 21 to 24) of the gasoline fuel-supply assembly 304 includes a fourth mount structure 306 defining an elongated opening 308 (best shown in FIGS. 20, 22, and 24) that intersects a passage 154 and is in fluid communication with the passage via an inlet 310 (shown in FIGS. 20 and 24). As shown, the fourth mount structure 306 is constructed and sized to enable a mounting of a relief valve 312 of the gasoline fuel-supply assembly 302 to the mounting plate 304, and extends outwardly (i.e., downwardly) from a second side 122 of a base structure of 120 the mounting plate 304. The relief valve 312 is engaged with the fourth mount structure 306 such that the relief valve 312 is in fluid communication with the elongated opening 308 and receives fuel from the passage 154 through the elongated opening 308. As shown, the relief valve 312 is arranged on the second side 122 of the base structure 120 and is secured to the fourth mount structure 306. The relief valve 312 enables a bleeding of the fuel from the passage 154 to the fuel-supply tank when a pressure of the fuel inside the passage 154 is above a threshold pressure limit. The fuel flows to the fuel-supply tank via a return tube 320 of the gasoline fuel-supply assembly 302 secured to the relief valve 312. In the embodiment the relief valve 312 includes a restrictor orifice sized to control an amount and/or rate of bleeding of the fuel from the passage 154 to the fuel-supply tank through the relief valve 312.

Figure 26:
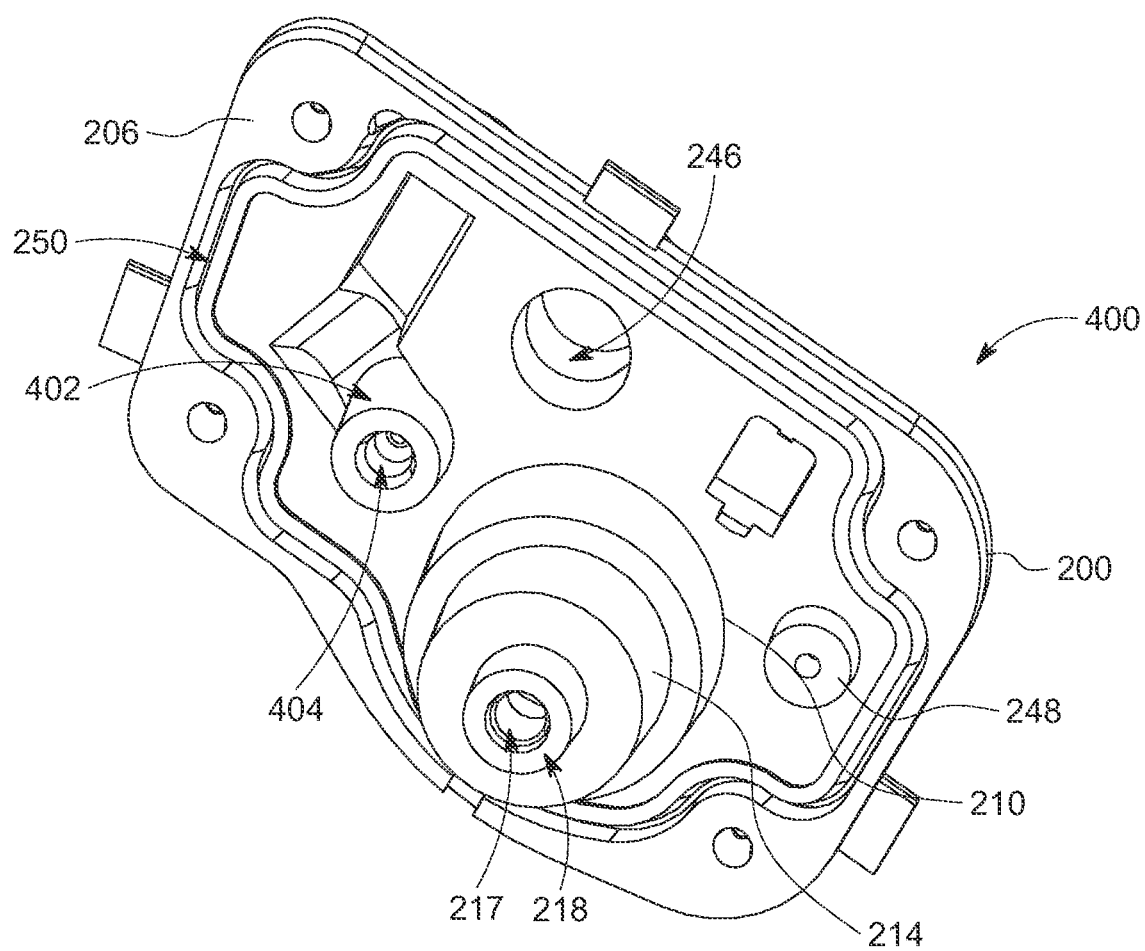
FIG. 26 illustrates a bottom perspective view of the mounting structure of FIG. 25.
Figure 27:
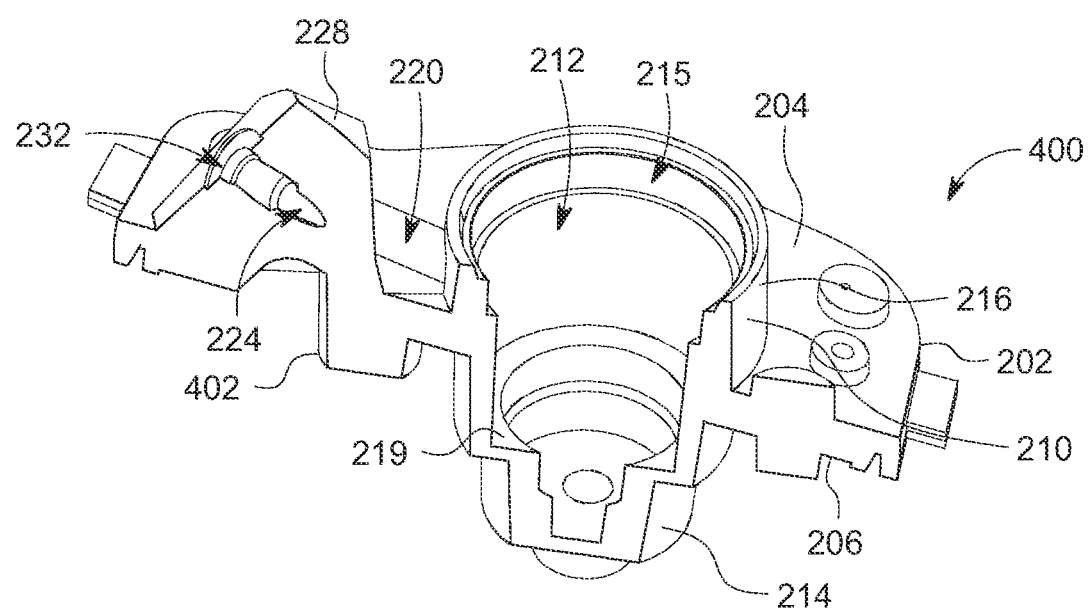
FIG. 27 illustrates a sectional perspective view of the mounting structure of FIG. 25 depicting a passage of a fuel-delivery conduit of the mounting structure.
Figure 28:
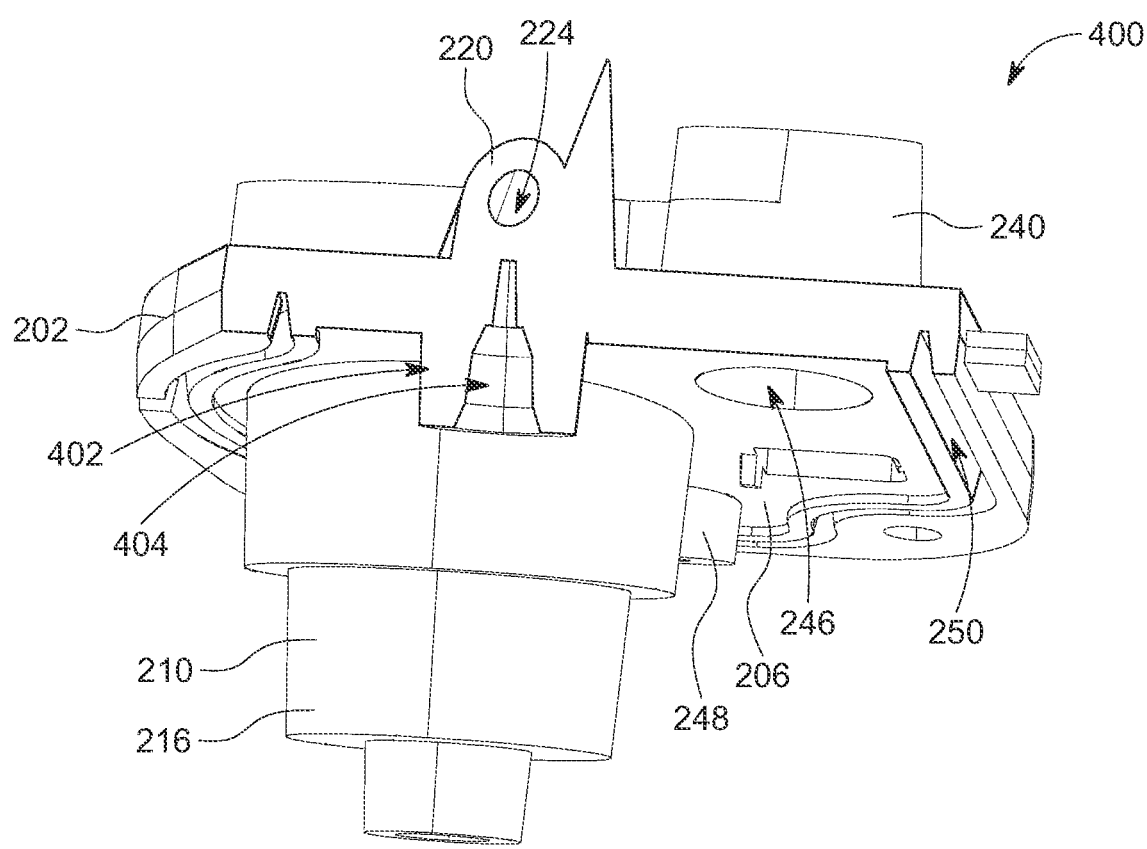
FIG. 28 illustrates a sectional perspective view of the mounting structure of FIG. 25 depicting an aperture associated with a fifth boss of the mounting structure.

A method of assembling the gasoline fuel-supply assembly 302 from a mounting structure 400 (shown in FIGS. 25-28) is now described. The mounting structure 400 is similar to the mounting structure 200 except that the mounting structure 400 includes a fifth boss 402 (best shown in FIG. 26 and FIG. 28) defining an aperture 404 (shown in FIG. 28). The fifth boss 402 extends downwardly of a second side 206 of a plate structure 202 of the mounting structure 400. It may be appreciated that the features of the mounting structure 400 that are identical to the features of the mounting structure 200 are given identical reference numerals. The method of assembling the gasoline fuel-supply assembly 302 is similar to the method 1400 of assembling the gasoline fuel-supply assembly 102 except that the method of assembling the gasoline fuel-supply assembly 302 additionally includes forming the elongated opening 308 through the fifth boss 402 such that the elongated opening 308 intersects with the passage 224 (i.e., the passage 154) forming the inlet 310. In the embodiment, the elongated opening 308 is formed by drilling the aperture 404 such that the inlet 310 is formed. However, it may be appreciated that the elongated opening along 308 with the inlet 310 may formed during formation of the mounting structure 400, for example during casting of the mounting structure 400 or may be formed by machining or drilling through the fifth boss 402. Accordingly, a fourth mount structure 306 and the elongated opening 308 is defined. The method also includes mounting the relief valve 312 along with the return tube 320 to the fourth mount structure 306. The relief valve 312 and the return conduit 312 are mounted to the second side 122 of the base structure 120 by using suitable connectors. Also, aperture 404 is plugged if a diesel fuel-supply assembly is formed by using the mounting structure 400. In some embodiments, the aperture remains closed if formed closed.

Many modifications and other embodiments of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims.

What is claimed is:

1. A method for assembling a fuel-supply assembly for use with a fuel tank to supply fuel to an internal combustion engine, the method comprising:
   providing a mounting structure configured to be secured to a fuel tank, wherein the mounting structure comprises:
   a plate structure having a top side and a bottom side,
   a first boss extending from the plate structure and defining a filter cavity shaped and sized to receive a fuel filter,
   a fuel-delivery conduit shaped and sized to define an outlet path for facilitating an exit of the fuel from the fuel-supply assembly, wherein the fuel-delivery conduit fluidly communicates with the filter cavity,
a second boss extending from the plate structure and defining an opening extending through the second boss, wherein the opening communicates with both the top side and the bottom side of the plate structure,
a third boss extending from the plate structure, and
a fourth boss extending from the plate structure;
determining whether the fuel-supply assembly is for use as a diesel fuel-supply assembly or as a gasoline fuel-supply assembly; and
providing an opening through one of either the third boss or the fourth boss, depending on whether the fuel-supply assembly is for use as a diesel fuel-supply assembly or a gasoline fuel-supply assembly, wherein the opening communicates with both the top side and the bottom side of the plate structure, and wherein the opening is through the third boss if the fuel-supply assembly is for use as a gasoline fuel-supply assembly, or the opening is through the fourth boss if the fuel-supply assembly is for use as a diesel fuel-supply assembly.

2. The method of claim 1 further comprising:
releasably securing a cap to the filter cavity, wherein the filter cavity and the cap are shaped, sized and located to provide access to the fuel filter when the fuel-supply assembly is secured to a fuel tank and the cap is removed.

3. The method of claim 1 further comprising:
placing a fuel sender through the opening associated with the second boss and securing the fuel sender to the second boss; and
placing a fuel-return conduit through the opening associated with the fourth boss and securing the fuel-return conduit to the fourth boss in response to determining that the fuel-supply assembly is for use as a diesel fuel-supply assembly.

4. The method of claim 1 further comprising:
placing a fuel sender through the opening associated with the second boss and securing the fuel sender to the second boss; and
placing a fuel pump connector through the opening associated with the third boss and securing the fuel pump connector to the third boss in response to determining that the fuel-supply assembly is for use as a gasoline fuel-supply assembly.

5. The method of claim 4, wherein the mounting structure includes a fuel pump bracket mount on the bottom side of the plate structure, the method further comprising:
attaching a fuel pump support structure to the fuel pump bracket mount in response to determining that the fuel-supply assembly is for use as a gasoline fuel-supply assembly.

6. The method of claim 5 further comprising:
mounting a fuel pump to the fuel pump support structure and electrically connecting the fuel pump connector to the fuel pump.

7. The method of claim 1, wherein the fuel-delivery conduit provides a first outlet location defining a first outlet port and a second outlet location defining a second outlet port.

8. The method of claim 7 further comprising:
determining whether the fuel-supply assembly is for use as a diesel fuel-supply assembly or as a gasoline fuel-supply assembly further comprises determining whether the fuel-supply assembly is for use as a diesel fuel-supply assembly for a certified diesel engine or for a non-certified diesel engine, and
providing the first outlet port as a fuel outlet port in response to determining that the fuel-supply assembly is for use as a diesel fuel-supply assembly for a non-certified diesel engine, or
providing the second outlet port as a fuel outlet port in response to determining that the fuel-supply assembly is for use as a diesel fuel-supply assembly for a certified diesel engine.

9. The method of claim 7, wherein in response to determining that the fuel-supply assembly is for use as a gasoline fuel-supply assembly, the method further comprises:
providing the first outlet port of the fuel-delivery conduit as a fuel outlet port, and
providing the second outlet port of the fuel-delivery conduit as a sensor port.

10. The method of claim 9 further comprising:
securing a sensor in the second outlet port of the fuel-delivery conduit.

11. The method of claim 1, wherein the mounting structure includes a fifth boss on the bottom side of the plate structure, and in response to determining that the fuel-supply assembly is for use as a gasoline fuel-supply assembly, the method further comprising:
providing an elongated opening through the fifth boss that communicates with the fuel-delivery conduit, wherein the elongated opening facilitates a bleeding of the fuel from the fuel-delivery conduit, and
securing a relief valve to the fifth boss such that relief valve communicates with the elongated opening and controls the bleeding of the fuel from the fuel-delivery conduit.

12. A fuel-supply assembly for an internal combustion engine, the fuel-supply assembly comprising:
a base structure having a first side and a second side opposite the first side;
a cavity at least partially formed in the base structure, the cavity shaped and sized for receiving a fuel filter;
a fuel-delivery conduit secured to the base structure and defining an outlet port position for facilitating an exit of fuel from the fuel-supply assembly, the fuel-delivery conduit being fluidly connected to the cavity;
a first mount structure secured to the base structure and defining a first aperture extending through the base structure, wherein the first aperture and the first mount structure are shaped and sized to hold and retain a fuel sender to the base structure;
a second mount structure secured to the base structure, wherein the second mount structure is shaped and sized to retain a fuel pump connector for a gasoline fuel-supply assembly to the base structure;
a third mount structure secured to the base structure, wherein the third mount structure is shaped and sized to retain a fuel-return conduit for a diesel fuel-supply assembly to the base structure;
a fourth mount structure secured to the base structure and extending downwardly of the base structure, wherein the fourth mount structure is shaped and sized to retain a relief valve for a gasoline fuel-supply assembly to the base structure; and
an elongated opening extending through the base structure and associated with the fourth mount structure and in fluid communication with the fuel-delivery conduit, wherein the relief valve fluidly communicates with the elongated opening and controls a bleeding of the fuel from the fuel-delivery conduit.

13. The fuel-supply assembly according to claim 12 further comprising:
a connector aperture extending through the base structure and associated with the second mount structure, wherein the connector aperture is shaped and sized to cooperate with the second mount structure for retaining a fuel pump connector to the base structure.

14. The fuel-supply assembly according to claim 12 further comprising:
a return aperture through the base structure and associated with the third mount structure, wherein the return aperture is shaped and sized to cooperate with the third mount structure for retaining a fuel-return conduit to the base structure.

15. The fuel-supply assembly according to claim 13, wherein
the outlet port position of the fuel-delivery conduit comprises a first outlet position and a second outlet position, and
a fuel outlet port is located at the first outlet position and a sensor port is located at the second outlet position, wherein the sensor port is shaped and sized to retain at least one sensor at the second outlet position.

16. The fuel-supply assembly according to claim 15 further comprising:
a fuel pump support structure secured to the base structure;
the fuel pump connector mounted in the connector aperture and secured to the second mount structure;
a fuel pump mounted to the fuel pump support structure and electrically connected to the fuel pump connector; and
the fuel sender mounted in the first aperture and secured to the first mount structure.

17. The fuel-supply assembly according to claim 14, wherein the fuel sender is mounted in the first aperture and secured to the first mount structure, and wherein the fuel-return conduit is mounted in the return aperture and secured to the third mount structure.

18. The fuel-supply assembly according to claim 17, wherein the outlet port position of the fuel-delivery conduit comprises a first outlet position and a second outlet position, and a fuel outlet port is located at the second outlet position for supplying fuel to a certified diesel engine.

19. The fuel-supply assembly according to claim 17, wherein the outlet port position of the fuel-delivery conduit comprises a first outlet position and a second outlet position, and a fuel outlet port is located at the first outlet position for supplying fuel to a non-certified diesel engine.

20. The fuel-supply assembly according to claim 12 further comprising:
a debris chamber communicating with the cavity shaped and sized for receiving the fuel filter, wherein an inlet conduit communicates with the debris chamber; and
a debris trap located in the debris chamber.

21. The fuel-supply assembly according to claim 20 further comprising:
an extension associated with the debris trap, wherein the extension is located proximate to the inlet conduit and extends away from the inlet conduit.

22. A fuel-supply assembly for an internal combustion engine, the fuel-supply assembly comprising:
a base structure having a first side and a second side opposite the first side;
a cavity at least partially formed in the base structure, the cavity shaped and sized for receiving a fuel filter;
a fuel-delivery conduit secured to the base structure and defining an outlet port position for facilitating an exit of fuel from the fuel-supply assembly, the fuel-delivery conduit being fluidly connected to the cavity;
a first mount structure secured to the base structure and defining a first aperture extending through the base structure, wherein the first aperture and the first mount structure are shaped and sized to hold and retain a fuel sender to the base structure;
a second mount structure secured to the base structure, wherein the second mount structure is shaped and sized to retain a fuel pump connector for a gasoline fuel-supply assembly to the base structure;
a third mount structure secured to the base structure, wherein the third mount structure is shaped and sized to retain a fuel-return conduit for a diesel fuel-supply assembly to the base structure; and
a connector aperture extending through the base structure and associated with the second mount structure, wherein the connector aperture is shaped and sized to cooperate with the second mount structure for retaining a fuel pump connector to the base structure;
wherein the outlet port position of the fuel-delivery conduit comprises a first outlet position and a second outlet position,
wherein a fuel outlet port is located at the first outlet position and a sensor port is located at the second outlet position, and
wherein the sensor port is shaped and sized to retain at least one sensor at the second outlet position.

23. The fuel-supply assembly according to claim 22 further comprising:
a return aperture through the base structure and associated with the third mount structure, wherein the return aperture is shaped and sized to cooperate with the third mount structure for retaining a fuel-return conduit to the base structure.

24. The fuel-supply assembly according to claim 23, wherein the fuel sender is mounted in the first aperture and secured to the first mount structure, and wherein the fuel-return conduit is mounted in the connector aperture and secured to the third mount structure.

25. The fuel-supply assembly according to claim 24, wherein the outlet port position of the fuel-delivery conduit comprises a first outlet position and a second outlet position, and a fuel outlet port is located at the second outlet position for supplying fuel to a certified diesel engine.

26. The fuel-supply assembly according to claim 24, wherein the outlet port position of the fuel-delivery conduit comprises a first outlet position and a second outlet position, and a fuel outlet port is located at the first outlet position for supplying fuel to a non-certified diesel engine.

27. The fuel-supply assembly according to claim 22 further comprising:
a fuel pump support structure secured to the base structure;
the fuel pump connector mounted in the connector aperture and secured to the second mount structure;
a fuel pump mounted to the fuel pump support structure and electrically connected to the fuel pump connector; and
the fuel sender mounted in the first aperture and secured to the first mount structure.

28. The fuel-supply assembly according to claim 22 further comprising:
a fourth mount structure secured to the base structure and extending downwardly of the base structure, wherein the fourth mount structure is shaped and sized to retain a relief valve for a gasoline fuel-supply assembly to the base structure, and an elongated opening extending through the base structure and associated with the fourth mount structure and in fluid communication with the fuel-delivery conduit, wherein the relief valve fluidly communicates with the elongated opening and controls a bleeding of the fuel from the fuel-delivery conduit.

29. The fuel-supply assembly according to claim 22 further comprising:

a debris chamber communicating with the cavity shaped and sized for receiving the fuel filter, wherein an inlet conduit communicates with the debris chamber; and a debris trap located in the debris chamber.

30. The fuel-supply assembly of claim 29 further comprising:

an extension associated with the debris trap, wherein the extension is located proximate to the inlet conduit and extends away from the inlet conduit.

31. A fuel-supply assembly for an internal combustion engine, the fuel-supply assembly comprising:

a base structure having a first side and a second side opposite the first side;

a cavity at least partially formed in the base structure, the cavity shaped and sized for receiving a fuel filter;

a fuel-delivery conduit secured to the base structure and defining an outlet port position for facilitating an exit of fuel from the fuel-supply assembly, the fuel-delivery conduit being fluidly connected to the cavity;

a first mount structure secured to the base structure and defining a first aperture extending through the base structure, wherein the first aperture and the first mount structure are shaped and sized to hold and retain a fuel sender to the base structure;

a second mount structure secured to the base structure, wherein the second mount structure is shaped and sized to retain a fuel pump connector for a gasoline fuel-supply assembly to the base structure;

a third mount structure secured to the base structure, wherein the third mount structure is shaped and sized to retain a fuel-return conduit for a diesel fuel-supply assembly to the base structure;

a debris chamber communicating with the cavity shaped and sized for receiving the fuel filter, wherein an inlet conduit communicates with the debris chamber; and a debris trap located in the debris chamber.

32. The fuel-supply assembly of claim 31 further comprising:

an extension associated with the debris trap, wherein the extension is located proximate to the inlet conduit and extends away from the inlet conduit.

33. The fuel-supply assembly according to claim 31 further comprising:

a connector aperture extending through the base structure and associated with the second mount structure, wherein the connector aperture is shaped and sized to cooperate with the second mount structure for retaining a fuel pump connector to the base structure.

34. The fuel-supply assembly according to claim 33, wherein the outlet port position of the fuel-delivery conduit comprises a first outlet position and a second outlet position, and a fuel outlet port is located at the first outlet position and a sensor port is located at the second outlet position, wherein the sensor port is shaped and sized to retain at least one sensor at the second outlet position.

35. The fuel-supply assembly according to claim 34 further comprising:

a fuel pump support structure secured to the base structure;

the fuel pump connector mounted in the connector aperture and secured to the second mount structure;

a fuel pump mounted to the fuel pump support structure and electrically connected to the fuel pump connector; and the fuel sender mounted in the first aperture and secured to the first mount structure.

36. The fuel-supply assembly according to claim 31 further comprising:

a return aperture through the base structure and associated with the third mount structure, wherein the return aperture is shaped and sized to cooperate with the third mount structure for retaining a fuel-return conduit to the base structure.

37. The fuel-supply assembly according to claim 36, wherein the fuel sender is mounted in the first aperture and secured to the first mount structure, and wherein the fuel-return conduit is mounted in the return aperture and secured to the third mount structure.

38. The fuel-supply assembly according to claim 37, wherein the outlet port position of the fuel-delivery conduit comprises a first outlet position and a second outlet position, and a fuel outlet port is located at the second outlet position for supplying fuel to a certified diesel engine.

39. The fuel-supply assembly according to claim 37, wherein the outlet port position of the fuel-delivery conduit comprises a first outlet position and a second outlet position, and a fuel outlet port is located at the first outlet position for supplying fuel to a non-certified diesel engine.

40. The fuel-supply assembly according to claim 31 further comprising:

a fourth mount structure secured to the base structure and extending downwardly of the base structure, wherein the fourth mount structure is shaped and sized to retain a relief valve for a gasoline fuel-supply assembly to the base structure, and an elongated opening extending through the base structure and associated with the fourth mount structure and in fluid communication with the fuel-delivery conduit, wherein the relief valve fluidly communicates with the elongated opening and controls a bleeding of the fuel from the fuel-delivery conduit.

* * * * *

UNITED STATES PATENT AND TRADEMARK OFFICE
CERTIFICATE OF CORRECTION

PATENT NO. : 11,485,221 B2
APPLICATION NO. : 17/188048
DATED : November 1, 2022
INVENTOR(S) : Gonzalez et al.

It is certified that error appears in the above-identified patent and that said Letters Patent is hereby corrected as shown below:

In the Drawings

Sheet 14 of 30, in "Fig. 14", Tag "1402", Line 1, delete "MOUNTIG STUCTURE" and insert --MOUNTING STRUCTURE-- therefor.

Sheet 16 of 30, in "Fig. 14", Tag "1424" Line 2, delete "ASSEMLY" and insert --ASSEMBLY-- therefor.

In the Specification

In Column 7, Line 16, delete "various component" and insert --various components-- therefor.

In Column 8, Line 19, delete "cooperates" and insert --cooperate-- therefor.

In Column 10, Line 39, delete "aperture and opening," and insert --apertures and openings,-- therefor.

In Column 11, Line 19, delete "cooperates" and insert --cooperate-- therefor.

In Column 11, Line 35, delete "potion" and insert --portion-- therefor.

In Column 11, Line 55, delete "connected to first" and insert --connected to the first-- therefor.

In Column 17, Line 39, delete "in assembly the diesel" and insert --assembly of the diesel-- therefor.

Signed and Sealed this
Sixteenth Day of January, 2024

Katherine Kelly Vidal
*Director of the United States Patent and Trademark Office*